US008089678B2

(12) United States Patent
Kumar et al.

(10) Patent No.: US 8,089,678 B2
(45) Date of Patent: Jan. 3, 2012

(54) CLEAR TO CIRCULAR POLARIZING PHOTOCHROMIC DEVICES AND METHODS OF MAKING THE SAME

(75) Inventors: Anil Kumar, Murrysville, PA (US); Peter C. Foller, Murrysville, PA (US); Elizabeth Furar, Pittsburgh, PA (US); Forrest R. Blackburn, Monroeville, PA (US)

(73) Assignee: Transitions Optical, Inc, Pinellas Park, FL (US)

(*) Notice: Subject to any disclaimer, the term of this patent is extended or adjusted under 35 U.S.C. 154(b) by 386 days.

(21) Appl. No.: 12/338,476

(22) Filed: Dec. 18, 2008

(65) Prior Publication Data
US 2009/0135462 A1 May 28, 2009

Related U.S. Application Data

(60) Continuation-in-part of application No. 11/590,055, filed on Oct. 31, 2006, now Pat. No. 7,978,391, which is a division of application No. 10/846,650, filed on May 17, 2004, now Pat. No. 7,256,921.

(60) Provisional application No. 60/484,100, filed on Jul. 1, 2003.

(51) Int. Cl.
*G02F 1/03* (2006.01)
(52) U.S. Cl. .................................................. 359/241
(58) Field of Classification Search .......... 359/241, 359/270, 271, 272, 273, 483, 485, 490, 494, 359/492, 495, 488, 489, 493, 497; 351/44, 351/163
See application file for complete search history.

(56) References Cited

U.S. PATENT DOCUMENTS

| 2,319,826 A | 5/1943 | Land |
| 2,334,446 A | 11/1943 | Serrell |
| 2,475,921 A | 7/1949 | Smith |
| 2,481,830 A | 9/1949 | Dreyer |

(Continued)

FOREIGN PATENT DOCUMENTS
EP 0321563 B1 6/1991
(Continued)

OTHER PUBLICATIONS

Hikmet, R.A.M and de Witz, C., "Gel Layer for Inducting Adjustable Pretilt Angles in Liquid Crystal Systems," *J. App. Phys.* vol. 70, No. 3, pp. 1265-1266 (Aug. 1991).

(Continued)

*Primary Examiner* — Ricky Mack
*Assistant Examiner* — Tuyen Q Tra
(74) *Attorney, Agent, or Firm* — Deborah M Altman; Frank P Mallak

(57) ABSTRACT

The present invention provides optical elements comprising a photochromic linear polarizing element and a birefringent layer that circularly or elliptically polarizes transmitted radiation. The photochromic linear polarizing element comprises a substrate and either: (1) a coating comprising an aligned, thermally reversible photochromic-dichroic compound having an average absorption ratio of at least 1.5 in an activated state, and being operable for switching from a first absorption state to a second absorption state in response to actinic radiation, to revert back to the first absorption state in response to thermal energy, and to linearly polarize transmitted radiation in at least one of the two states; or (2) an at least partially ordered polymeric sheet connected to the substrate; and a thermally reversible photochromic-dichroic compound that is at least partially aligned with the polymeric sheet and has an average absorption ratio greater than 2.3 in the activated state.

22 Claims, 1 Drawing Sheet

U.S. PATENT DOCUMENTS

| | | | |
|---|---|---|---|
| 2,544,659 A | 3/1951 | Dreyer | |
| 3,276,316 A | 10/1966 | Makas | |
| 3,361,706 A | 1/1968 | Meriwether et al. | |
| 3,653,863 A | 4/1972 | Araujo et al. | |
| 4,039,254 A | 8/1977 | Harsch | |
| 4,043,637 A | 8/1977 | Hovey | |
| 4,049,338 A | 9/1977 | Slocum | |
| 4,110,015 A | 8/1978 | Reddy | |
| 4,166,043 A | 8/1979 | Uhlmann et al. | |
| 4,190,330 A | 2/1980 | Berreman | |
| 4,309,082 A | 1/1982 | Kohara et al. | |
| 4,367,170 A | 1/1983 | Uhlmann et al. | |
| 4,549,894 A | 10/1985 | Araujo et al. | |
| 4,556,605 A | 12/1985 | Mogami et al. | |
| 4,637,896 A | 1/1987 | Shannon | |
| 4,648,925 A | 3/1987 | Goepfert et al. | |
| 4,683,153 A | 7/1987 | Goepfert et al. | |
| 4,728,173 A | 3/1988 | Toth | |
| 4,756,605 A | 7/1988 | Okada et al. | |
| 4,756,973 A | 7/1988 | Sakagami et al. | |
| 4,810,433 A | 3/1989 | Takayanagi et al. | |
| 4,838,673 A | 6/1989 | Richards et al. | |
| 4,863,763 A | 9/1989 | Takeda et al. | |
| 4,865,668 A | 9/1989 | Goepfert et al. | |
| 4,873,026 A | 10/1989 | Behre et al. | |
| 4,873,029 A | 10/1989 | Blum | |
| 4,931,220 A | 6/1990 | Haynes et al. | |
| 4,974,941 A | 12/1990 | Gibbons et al. | |
| 4,977,028 A | 12/1990 | Goepfert et al. | |
| 5,067,795 A | 11/1991 | Senatore | |
| 5,073,294 A | 12/1991 | Shannon et al. | |
| 5,130,353 A | 7/1992 | Fischer et al. | |
| 5,155,607 A | 10/1992 | Inoue et al. | |
| 5,180,470 A | 1/1993 | Smith et al. | |
| 5,185,390 A | 2/1993 | Fischer et al. | |
| 5,189,448 A | 2/1993 | Yaguchi | |
| 5,202,053 A | 4/1993 | Shannon | |
| 5,204,850 A | 4/1993 | Broer et al. | |
| 5,247,377 A | 9/1993 | Omeis et al. | |
| 5,464,669 A | 11/1995 | Kang et al. | |
| 5,550,661 A | 8/1996 | Clark et al. | |
| 5,602,661 A | 2/1997 | Schadt et al. | |
| 5,608,567 A | 3/1997 | Grupp | |
| 5,641,846 A | 6/1997 | Bieringer et al. | |
| 5,644,416 A | 7/1997 | Morikawa et al. | |
| 5,645,767 A | 7/1997 | Van Gemert | |
| 5,658,501 A | 8/1997 | Kumar et al. | |
| 5,698,141 A | 12/1997 | Kumar | |
| 5,723,072 A | 3/1998 | Kumar | |
| 5,746,949 A | 5/1998 | Shen et al. | |
| 5,846,452 A | 12/1998 | Gibbons et al. | |
| 5,903,330 A | 5/1999 | Funfschilling et al. | |
| 5,943,104 A | 8/1999 | Moddel et al. | |
| 5,948,487 A | 9/1999 | Sahouani et al. | |
| 5,952,515 A | 9/1999 | Melzig et al. | |
| 5,962,617 A | 10/1999 | Slagel | |
| 6,022,497 A | 2/2000 | Kumar | |
| 6,025,026 A | 2/2000 | Smith et al. | |
| 6,036,890 A | 3/2000 | Melzig et al. | |
| 6,049,428 A | 4/2000 | Khan et al. | |
| 6,060,001 A | 5/2000 | Welch et al. | |
| 6,080,338 A | 6/2000 | Kumar | |
| 6,113,814 A | 9/2000 | Gemert et al. | |
| 6,136,968 A | 10/2000 | Chamontin et al. | |
| 6,150,430 A | 11/2000 | Walters et al. | |
| 6,153,126 A | 11/2000 | Kumar | |
| 6,160,597 A | 12/2000 | Schadt et al. | |
| 6,187,444 B1 | 2/2001 | Bowles, III et al. | |
| 6,239,778 B1 | 5/2001 | Palffy-Muhoray et al. | |
| 6,245,399 B1 | 6/2001 | Sahouani et al. | |
| 6,268,055 B1 | 7/2001 | Walters et al. | |
| 6,281,366 B1 | 8/2001 | Frigoli et al. | |
| 6,284,418 B1 | 9/2001 | Trantolo | |
| 6,296,785 B1 | 10/2001 | Nelson et al. | |
| 6,312,811 B1 | 11/2001 | Frigoli et al. | |
| 6,334,681 B1 | 1/2002 | Perrott et al. | |
| 6,338,808 B1 | 1/2002 | Kawata et al. | |
| 6,348,604 B1 | 2/2002 | Nelson et al. | |
| 6,353,102 B1 | 3/2002 | Kumar | |
| 6,369,869 B2 | 4/2002 | Schadt et al. | |
| 6,432,544 B1 | 8/2002 | Stewart et al. | |
| 6,433,043 B1 | 8/2002 | Misura et al. | |
| 6,436,525 B1 | 8/2002 | Welch et al. | |
| 6,474,695 B1 | 11/2002 | Schneider et al. | |
| 6,506,488 B1 | 1/2003 | Stewart et al. | |
| 6,531,076 B2 | 3/2003 | Crano et al. | |
| 6,555,028 B2 | 4/2003 | Walters et al. | |
| 6,579,422 B1 | 6/2003 | Fünfschilling et al. | |
| 6,597,422 B1 | 7/2003 | Fünfschilling et al. | |
| 6,602,603 B2 | 8/2003 | Welch et al. | |
| 6,613,433 B2 | 9/2003 | Yamamoto et al. | |
| 6,621,616 B1 | 9/2003 | Bauer et al. | |
| 6,630,597 B1 | 10/2003 | Lin et al. | |
| 6,641,874 B2 | 11/2003 | Kuntz et al. | |
| 6,690,495 B1 | 2/2004 | Kosa et al. | |
| 6,705,569 B1 | 3/2004 | Sanders et al. | |
| 6,717,644 B2 | 4/2004 | Schadt et al. | |
| 6,723,072 B2 | 4/2004 | Flaherty et al. | |
| 6,761,452 B2 | 7/2004 | Moravec et al. | |
| 6,844,686 B1 | 1/2005 | Schneck et al. | |
| 6,853,423 B2 | 2/2005 | Arakawa et al. | |
| 6,863,848 B2 * | 3/2005 | Engardio et al. | 264/1.36 |
| 6,864,932 B2 | 3/2005 | Miyatake et al. | |
| 6,874,888 B1 | 4/2005 | Dudai | |
| 6,963,437 B2 | 11/2005 | Bauer et al. | |
| 6,999,220 B2 * | 2/2006 | Kosa et al. | 359/241 |
| 7,245,347 B2 | 7/2007 | Lundgren | |
| 7,256,921 B2 | 8/2007 | Kumar et al. | |
| 2002/0039627 A1 | 4/2002 | Ichihashi et al. | |
| 2002/0090516 A1 | 7/2002 | Loshak et al. | |
| 2002/0167639 A1 | 11/2002 | Coates et al. | |
| 2002/0180916 A1 | 12/2002 | Schadt et al. | |
| 2003/0008958 A1 | 1/2003 | Momoda et al. | |
| 2003/0045612 A1 | 3/2003 | Misura et al. | |
| 2003/0189684 A1 | 10/2003 | Kuntz et al. | |
| 2004/0046927 A1 | 3/2004 | Montgomery | |
| 2004/0125337 A1 | 7/2004 | Boulineau et al. | |
| 2004/0158028 A1 | 8/2004 | Bühler | |
| 2004/0223221 A1 | 11/2004 | Sugimura et al. | |
| 2005/0003107 A1 | 1/2005 | Kumar et al. | |
| 2005/0004361 A1 | 1/2005 | Kumar et al. | |
| 2005/0012998 A1 | 1/2005 | Kumar et al. | |
| 2005/0146680 A1 | 7/2005 | Muisener et al. | |
| 2007/0041073 A1 | 2/2007 | Kumar et al. | |
| 2009/0135462 A1 | 5/2009 | Kumar et al. | |

FOREIGN PATENT DOCUMENTS

| | | |
|---|---|---|
| EP | 0 488 164 A2 | 11/1991 |
| EP | 0619358 A1 | 3/1993 |
| EP | 0 543 678 A1 | 5/1993 |
| EP | 0 397 263 B1 | 12/1994 |
| EP | 0 331 233 B1 | 4/1997 |
| EP | 0 772 069 A1 | 5/1997 |
| EP | 0965628 A1 | 6/1999 |
| GB | 583842 | 1/1947 |
| GB | 2 169 417 A | 7/1986 |
| JP | 59 135428 | 8/1984 |
| JP | 03 200118 | 9/1991 |
| JP | 03 200218 | 9/1991 |
| WO | WO 89/05464 | 6/1989 |
| WO | WO 92/01959 | 6/1992 |
| WO | WO 93/17071 A1 | 2/1993 |
| WO | WO 98/19207 | 5/1998 |
| WO | WO 00/15630 | 3/2000 |
| WO | WO 00/19252 | 4/2000 |
| WO | WO 01/02449 A2 | 1/2001 |
| WO | WO 01/19813 A1 | 3/2001 |
| WO | WO 01/70719 A2 | 9/2001 |
| WO | WO 03/32066 A1 | 4/2003 |
| WO | WO 2005/084826 A1 | 9/2005 |
| WO | WO 2005/085912 A1 | 9/2005 |

OTHER PUBLICATIONS

Kvasnikov, E.D., Kozenkov, V.M., and Barachevskii, V.A., "Birefringence in Polyvinylcinnamate Films Induced by Polarized Light," *Dokiady Akademil nauk SSSR*, vol. 237, No. 3, USSR pp. 633-636 (1977).

Kozenkov, V.M., Chigrinov, V.G., and Kwok, H.S. "Photoanisotropic Effects in Poly (Vinyl-Cinnamate) Derivatives and Their Applications," *Mol. Cryst. Liq. Cryst.*, vol. 409, pp. 251-267 (2004).

Schadt, Martin et al. "Surface-Induced Parallel Alignment of Liquid Crystals by Linearly Polymerized Photopolymers," *Jpn. J. Appl. Phys.* vol. 31, No. 7, pp. 2155-2164 (Jul. 1992).

Schadt, Martin "Optics and Applications of Photo-Aligned Liquid Crystalline Surfaces," *Nonlinear Optics*, vol. 25, pp. 1-12 (2000).

Schadt, Martin "Liquid Crystal Displays and Novel Optical Thin Films Enabled by Photo-Alignment," *Mol. Cryst. Liq. Cryst.* vol. 364, pp. 151-169 (2001).

Dyadyusha, A.G. et al. "Light-Induced Planar Orientation of a Nematic Liquid Crystal on an Anisotropic Surface without Microrelief," *Ukr. Fiz. Zhurn*, (Ukraine), vol. 35, No. 5, pp. 1059-1062.

Castellano, Joseph A. "Surface Anchoring of Liquid Crystal Molecules on Various Substrates," *Mol. Cryst. Liq. Cryst.*, vol. 94, pp. 33-41 (1983).

Huang, D.D. et al. "Effect of Aligning Layer Thickness on Photo-Aligned Ferroelectric Liquid Crystal Displays," *Proceedings of the 6th Chinese Optoelectronics Symposium, Hong Kong China*, IEEE (New York), pp. 231-234 (2003).

Chigrinov, V.G. and Kozenkov, V.M., "New Results on Liquid Crystal Alignment by Photopolymerization," *Proceedings of the SPIE-The Internationali Society for Optical Engineering*, SPIE vol. 2409 pp. 130-140 (1995).

* cited by examiner

CLEAR TO CIRCULAR POLARIZING PHOTOCHROMIC DEVICES AND METHODS OF MAKING THE SAME

CROSS-REFERENCE TO RELATED APPLICATIONS

This application is a continuation-in-part of U.S. patent application Ser. No. 11/590,055, filed Oct. 31, 2006 now U.S. Pat. No. 7,978,391, which is a divisional of U.S. patent application Ser. No. 10/846,650, filed May 17, 2004, now U.S. Pat. No. 7,256,921, which in turn claims the benefit of U.S. Provisional Application Ser. No. 60/484,100, filed Jul. 1, 2003, each of which is hereby specifically incorporated by reference.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

Various embodiments disclosed herein relate generally to optical elements, security liquid crystal cells and methods of making the same.

Display screens on mobile devices, ATM's, and other machines that may be used outdoors often have problems with sunlight readability, UV degradation, durability, operating temperature range, and lifetime. Sunlight readability may be improved in a number of ways. One solution is to actively increase the backlight intensity by adding more cold-cathode-fluorescent-lamp (CCFL) backlight tubes. Unfortunately, this approach has drawbacks in most mobile device applications because of battery drain, larger device size, heat generation, and weight considerations. A second approach is to passively increase backlight intensity by adding brightness-enhancement films to the optical stack of the LCD. While avoiding most of the drawbacks of the active approach, this solution only increases brightness by a factor of about two, which is insufficient to solve the sunlight readability problem. A third solution is the minimization of reflected light, such as through the use of anti-reflective coatings and films and circular polarizers. Each of these solutions may be combined with others to optimize the desired effect.

A circular polarizer is an assembly of a conventional linearly polarizing element and a quarter wave retarder. The axis of the retarder is oriented at 45 degrees with respect to the axis of the linear polarizer. As incident light passes through the assembly, it is converted to circularly polarized light. Circular polarizers have traditionally been used for their antireflective properties. In such applications, when light is reflected back from a specular surface through the retarder, the plane of polarization is rotated 90 degrees with respect to the original orientation so the linear polarizer blocks the returning reflected light.

Conventional linearly polarizing elements, such as linearly polarizing lenses for sunglasses and linearly polarizing filters, are typically formed from stretched polymer sheets containing a dichroic material, such as a dichroic dye. The conventional linearly polarizing elements are static elements having a single, linearly polarizing state. Thus when a conventional linearly polarizing element is exposed to either randomly polarized radiation or reflected radiation of the appropriate wavelength, some percentage of the radiation transmitted through the element will be linearly polarized. As used herein the term "linearly polarize" means to confine the vibrations of the electric vector of light waves to one direction or plane.

Further, conventional linearly polarizing elements are typically tinted using a coloring agent (i.e., the dichroic material) and have an absorption spectrum that does not vary in response to actinic radiation. As used herein "actinic radiation" means electromagnetic radiation, such as but not limited to ultraviolet and visible radiation that is capable of causing a response. The color of the conventional linearly polarizing element will depend upon the coloring agent used to form the element, and most commonly is a neutral color (for example, brown or gray). While conventional linearly polarizing elements are useful in reducing reflected light glare, because of their tint they are not well suited for use under certain low-light conditions. Further, because conventional linearly polarizing elements have only a single, tinted linearly polarizing state, they are limited in their ability to store or display information.

As discussed above, conventional linearly polarizing elements are typically formed using sheets of stretched polymer films containing a dichroic material. As used herein the term "dichroic" means capable of absorbing one of two orthogonal plane polarized components of transmitted radiation more strongly than the other. Thus, while dichroic materials are capable of preferentially absorbing one of two orthogonal plane polarized components of transmitted radiation, if the molecules of the dichroic material are not suitably positioned or arranged, no net linear polarization of transmitted radiation will be achieved. That is, due to the random positioning of the molecules of the dichroic material, selective absorption by the individual molecules will cancel each other such that no net or overall linear polarizing effect is achieved. Thus, it is generally necessary to suitably position or arrange the molecules of the dichroic material by alignment with another material in order to achieve a net linear polarization.

One common method of aligning the molecules of a dichroic dye involves heating a sheet or layer of polyvinyl alcohol ("PVA") to soften the PVA and then stretching the sheet to orient the PVA polymer chains. Then the dichroic dye is impregnated into the stretched sheet and dye molecules take on the orientation of the polymer chains. That is, the dye molecules become aligned such that the long axis of the dye molecule are generally parallel to the oriented polymer chains. Alternatively, the dichroic dye can be first impregnated into the PVA sheet, and then the sheet can be heated and stretched as described above to orient the PVA polymer chains and associated dye. This allows the molecules of the dichroic dye to be suitably positioned or arranged within the oriented polymer chains of the PVA sheet and a net linear polarization to be achieved. That is, the PVA sheet can be made to linearly polarize transmitted radiation, or in other words, a linearly polarizing filter can be formed.

In contrast to the dichroic elements discussed above, conventional photochromic elements, such as photochromic lenses that are formed using conventional thermally reversible photochromic materials are generally capable of converting from a first state, for example a "clear state," to a second state, for example a "colored state," in response to actinic radiation, and reverting back to the first state in response to thermal energy. As used herein the term "photochromic" means having an absorption spectrum for at least visible radiation that varies in response to at least actinic radiation.

Thus, conventional photochromic elements are generally well suited for use in both low-light and bright conditions. However, conventional photochromic elements that do not include linearly polarizing filters are generally not adapted to linearly polarize radiation. That is, the absorption ratio of conventional photochromic elements, in either state, is generally less than two. As used herein the term "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance. Therefore, conventional photochromic elements cannot reduce reflected light glare to the same extent as conventional linearly polarizing elements. Further, conventional photochromic elements have a limited ability to store or display information.

Accordingly, it would be advantageous to provide elements and devices that are adapted to display both linearly polarizing and photochromic properties. Further, it would be advantageous to provide elements and devices that are adapted to display circular or elliptical polarization and photochromic properties, for example, in an effort to improve sunlight readability of display screens. Such elements and devices can also be used to improve visibility through packaging materials and protect light-sensitive items contained within the packaging materials.

SUMMARY OF THE DISCLOSURE

The present invention provides an optical element comprising:
(a) a photochromic linear polarizing element comprising:
    (i) a substrate; and
    (ii) a coating connected to the substrate, the coating having a first absorption state and a second absorption state and being operable for switching from the first absorption state to the second absorption state in response to actinic radiation, to revert back to the first absorption state in response to actinic radiation and/or thermal energy, and to linearly polarize transmitted radiation in the first absorption state and/or the second absorption state; wherein the coating (ii) comprises an at least partially aligned, thermally reversible photochromic-dichroic material having an average absorption ratio of at least 1.5 in an activated state; and
(b) a birefringent layer connected to the photochromic linear polarizing element (a), the birefringent layer being operable to circularly or elliptically polarize transmitted radiation. Note that the coating need not cover the entire surface of the substrate; i.e., it may be a partial coating.

In a separate embodiment, the present invention provides a composite optical element comprising:
(a) a photochromic linear polarizing element comprising:
    (i) an at least partially ordered polymeric sheet; and
    (ii) a reversible photochromic-dichroic material that is at least partially aligned with the polymeric sheet and has an average absorption ratio of at least 1.5 in the activated state; and
(b) a birefringent layer connected to the photochromic linear polarizing element (a), the birefringent layer being operable to circularly or elliptically polarize transmitted radiation.

BRIEF DESCRIPTION OF THE VIEW OF THE DRAWING

Various embodiments of the present invention will be better understood when read in conjunction with the drawing, in which.

DETAILED DESCRIPTION OF EMBODIMENTS

Figure 1:
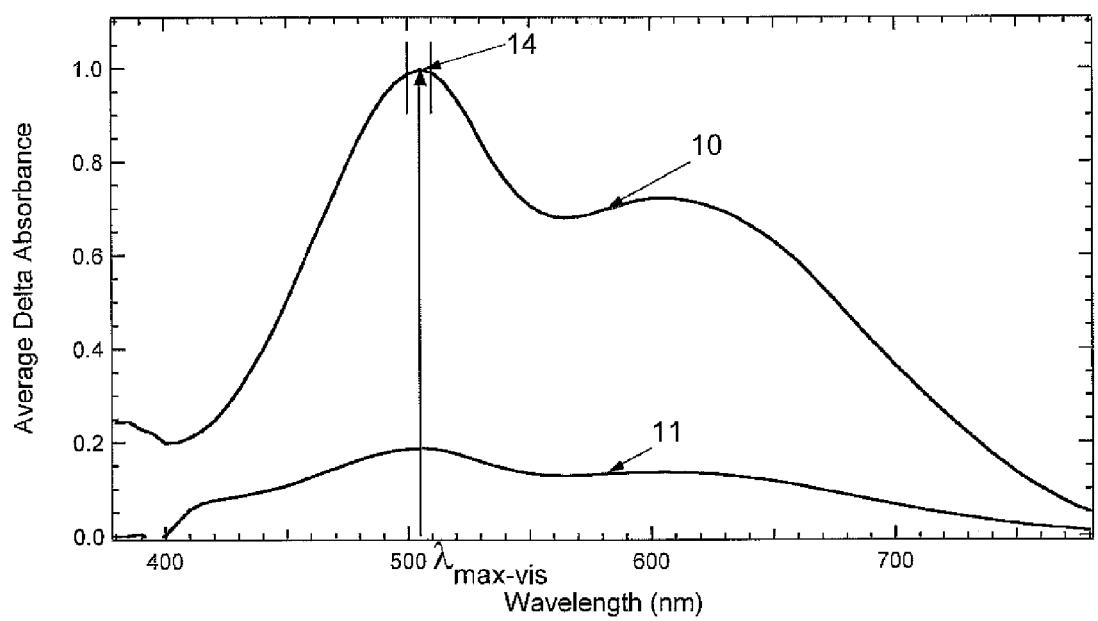
FIG. 1 shows two average difference absorption spectra obtained for a coating according to various embodiment disclosed herein.

As used in this specification and the appended claims, the articles "a," "an," and "the" include plural referents unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from the measurement equipment and/or measurement technique.

Optical elements and devices according to various embodiments of the present invention will now be described. Various embodiments disclosed herein provide an optical element comprising a substrate and a coating having a first state and a second state connected to the substrate, the coating being operable to switch from the first state to the second state in response to actinic (and/or other) radiation, to revert back to the first state in response to thermal energy, and to linearly polarize transmitted radiation in at least one of the first state and the second state. As used herein, the term "thermal energy" means any form of heat.

As used herein to modify the term "state," the terms "first" and "second" are not intended to refer to any particular order or chronology, but instead refer to two different conditions or properties. For example, although not limiting herein, the first state and the second state of the coating may differ with respect to at least one optical property, such as but not limited to the absorption or linearly polarization of visible and/or UV radiation. Thus, according to various embodiments disclosed herein, the coating can be adapted to have a different absorption spectrum in each of the first and second state. For example, while not limiting herein, the coating can be clear in the first state and colored in the second state. Alternatively, the coating can be adapted to have a first color in the first state and a second color in the second state. Further, as discussed below in more detail, the coating can be adapted to not be linearly polarizing (or "non-polarizing") in the first state and linearly polarizing in the second state.

As used herein the term "optical" means pertaining to or associated with light and/or vision. For example, according to various embodiments disclosed herein, the optical element or device can be chosen from ophthalmic elements and devices, display elements and devices, windows, mirrors, packaging materials such as clear packaging materials including shrink wrap and clear removable protective overlays and packaging materials prepared from polymeric materials such as any of the polymeric substrates described herein below, and active and passive liquid crystal cell elements and devices. As used herein the term "ophthalmic" means pertaining to or associated with the eye and vision. Examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors. As used herein the term "display" means the visible or machine-readable representation of information in words, numbers, symbols, designs or drawings. Examples of display elements and devices include screens, monitors, and security elements, such as security marks. As used herein the term "window" means an aperture adapted to permit the transmission of radiation therethrough. Examples of windows include automotive and aircraft transparencies, filters, shutters, and optical switches. As used herein the term "mirror" means a surface that specularly reflects a large fraction of incident light.

As used herein, the term "light-sensitive" products includes foodstuffs, cosmetics, pharmaceuticals, optical devices, electronic components, etc. that upon exposure to light demonstrate an adverse effect such as spoilage, premature aging, inactivation of active or functional components, as known to those skilled in the art.

As used herein the term "liquid crystal cell" refers to a structure containing a liquid crystal material that is capable of being ordered. Active liquid crystal cells are cells wherein the liquid crystal material is capable of being switched between ordered and disordered states or between two ordered states by the application of an external force, such as electric or magnetic fields. Passive liquid crystal cells are cells wherein the liquid crystal material maintains an ordered state. One example of an active liquid crystal cell element or device is a liquid crystal display.

As used herein the term "coating" means a supported film derived from a flowable composition, which may or may not have a uniform thickness, and specifically excludes polymeric sheets. As used herein the term "sheet" means a preformed film having a generally uniform thickness and capable of self-support. Further, as used herein the term "connected to" means in direct contact with an object or indirect contact with an object through one or more other structures or materials, at least one of which is in direct contact with the object. Thus, according to various embodiments disclosed herein, the coating having the first state and the second state can be in direct contact with at least a portion of the substrate or it can be in indirect contact with at least a portion of the substrate through one or more other structures or materials. For example, although not limiting herein, the coating can be in contact with one or more other at least partial coatings, polymer sheets or combinations thereof, at least one of which is in direct contact with at least a portion of the substrate.

Generally speaking, substrates that are suitable for use in conjunction with various embodiments disclosed herein include, but are not limited to, substrates formed from organic materials, inorganic materials, or combinations thereof (for example, composite materials). Examples of substrates that can be used in accordance with various embodiments disclosed herein are described in more detail below.

Specific examples of organic materials that may be used to form the substrates disclosed herein include polymeric materials, for examples, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol (meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly (vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

While not limiting herein, according to various embodiments disclosed herein, the substrate can be an ophthalmic substrate. As used herein the term "ophthalmic substrate" means lenses, partially formed lenses, and lens blanks. Examples of organic materials suitable for use in forming ophthalmic substrates according to various embodiments disclosed herein include, but are not limited to, the art-recognized polymers that are useful as ophthalmic substrates, e.g., organic optical resins that are used to prepare optically clear castings for optical applications, such as ophthalmic lenses.

Other examples of organic materials suitable for use in forming the substrates according to various embodiments disclosed herein include both synthetic and natural organic materials, including without limitation: opaque or translucent polymeric materials, natural and synthetic textiles, and cellulosic materials such as, paper and wood.

Examples of inorganic materials suitable for use in forming the substrates according to various embodiments disclosed herein include glasses, minerals, ceramics, and metals. For example, in one embodiment the substrate can comprise glass. In other embodiments, the substrate can have a reflective surface, for example, a polished ceramic substrate, metal substrate, or mineral substrate. In other embodiments, a reflective coating or layer can be deposited or otherwise applied to a surface of an inorganic or an organic substrate to make it reflective or to enhance its reflectivity.

Further, according to certain embodiments disclosed herein, the substrates may have a protective coating, such as, but not limited to, an abrasion-resistant coating, such as a "hard coat," on their exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as but not limited to an abrasion-resistant coating, on its surface(s).

Still further, the substrates according to various embodiments disclosed herein can be untinted, tinted, linearly polarizing, circularly polarizing, elliptically polarizing, photochromic, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, with reference to substrates the term "tinted" means substrates that have a coloring agent addition (such as, but not limited to, conventional dyes) and an absorption spectrum for visible radiation that does not vary significantly in response to actinic radiation.

As used herein the term "linearly polarizing" with reference to substrates refers to substrates that are adapted to linearly polarize radiation. As used herein the term "circularly polarizing" with reference to substrates refers to substrates that are adapted to circularly polarize radiation. As used herein the term "elliptically polarizing" with reference to substrates refers to substrates that are adapted to elliptically polarize radiation. As used herein with the term "photochromic" with reference to substrates refers to substrates having an absorption spectrum for visible radiation that varies in response to at least actinic radiation. Further, as used herein with reference to substrates, the term "tinted-photochromic" means substrates containing a coloring agent addition as well as a photochromic material, and having an absorption spectrum for visible radiation that varies in response to at least actinic radiation. Thus, for example and without limitation, the tinted-photochromic substrate can have a first color characteristic of the coloring agent and a second color characteristic of the combination of the coloring agent the photochromic material when exposed to actinic radiation.

As previously discussed, conventional linearly polarizing elements are typically formed using stretched polymer sheets and a dichroic dye. However, these conventional linearly polarizing elements generally have a single tinted, linearly polarizing state. As previously discussed, the term "linearly polarize" means to confine the vibrations of the electric vector of light waves to one direction. Further, as previously discussed, conventional photochromic elements are formed from conventional photochromic compounds and have at least two states, for example a clear state and a colored state. As previously discussed, the term "photochromic" means having an absorption spectrum for at least visible radiation that varies in response to at least actinic radiation. However, conventional photochromic elements are generally not adapted to linearly polarize radiation.

As discussed above, the optical elements according to various embodiments disclosed herein comprise a coating (ii) connected to the substrate, the coating having a first absorption state and a second absorption state, typically switching from the first state to the second state in response to actinic radiation, reverting back to the first state in response to actinic and/or thermal energy, and demonstrating linear polarization in at least one of the first state and the second state. That is, the optical elements according to various embodiments disclosed herein can be photochromic-dichroic elements. As used herein the term "photochromic-dichroic" means displaying both photochromic and dichroic (i.e., linearly polarizing) properties under certain conditions, which properties are at least detectable by instrumentation. Further, as discussed below in more detail, the optical elements according to various embodiments disclosed herein can be formed using at least one photochromic-dichroic compound that is at least partially aligned.

As previously mentioned, according to various embodiments disclosed herein, the coating can be non-polarizing in the first state (that is, the coating will not confine the vibrations of the electric vector of light waves to one direction) and linearly polarizing transmitted radiation in the second state. As used herein the term "transmitted radiation" refers to radiation that is passed through at least a portion of an object. Although not limiting herein, the transmitted radiation can be ultraviolet radiation, visible radiation, or a combination thereof. Thus, according to various embodiments disclosed herein, the coating can be non-polarizing in the first state and linearly polarizing transmitted ultraviolet radiation, transmitted visible radiation, or a combination thereof in the second state.

According to still other embodiments, the coating (ii) can have a first absorption spectrum in the first state, a second absorption spectrum in the second state, and to be linearly polarizing in both the first and second states.

According to certain embodiments, the coating (ii) can have an average absorption ratio of at least 1.5 in at least one state. For example, the coating can have an average absorption ratio ranging from at least 1.5 to 50 (or greater) in at least one state. As previously discussed, the term "absorption ratio" refers to the ratio of the absorbance of radiation linearly polarized in a first plane to the absorbance of radiation linearly polarized in a plane orthogonal to the first plane, wherein the first plane is taken as the plane with the highest absorbance. Thus, the absorption ratio (and the average absorption ratio which is described below) is an indication of how strongly one of two orthogonal plane polarized components of radiation is absorbed by an object or material.

The average absorption ratio of a coating or element comprising a photochromic-dichroic compound can be determined as set forth below. For example, to determine the average absorption ratio of a coating comprising a photochromic-dichroic compound, a substrate having a coating is positioned on an optical bench and the coating is placed in a linearly polarizing state by activation of the photochromic-dichroic compound. Activation is achieved by exposing the coating to UV radiation for a time sufficient to reach a saturated or near saturated state (that is, a state wherein the absorption properties of the coating do not substantially change over the interval of time during which the measurements are made). Absorption measurements are taken over a period of time (typically 10 to 300 seconds) at 3 second intervals for light that is linearly polarized in a plane perpendicular to the optical bench (referred to as the 0° polarization plane or direction) and light that is linearly polarized in a plane that is parallel to the optical bench (referred to as the 900 polarization plane or direction) in the following sequence: 0°, 90°, 90°, 0° etc. The absorbance of the linearly polarized light by the coating is measured at each time interval for all of the wavelengths tested and the unactivated absorbance (i.e., the absorbance of the coating in an unactivated state) over the same range of wavelengths is subtracted to obtain absorption spectra for the coating in an activated state in each of the 0° and 90° polarization planes to obtain an average difference absorption spectrum in each polarization plane for the coating in the saturated or near-saturated state.

For example, with reference to FIG. 1, there is shown the average difference absorption spectrum (generally indicated 10) in one polarization plane that was obtained for a coating according to one embodiment disclosed herein. The average absorption spectrum (generally indicated 11) is the average difference absorption spectrum obtained for the same coating in the orthogonal polarization plane.

Based on the average difference absorption spectra obtained for the coating, the average absorption ratio for the coating is obtained as follows. The absorption ratio of the coating at each wavelength in a predetermined range of wavelengths corresponding to $\lambda_{max-vis}+/-5$ nanometers (generally indicated as 14 in FIG. 1), wherein $\lambda_{max-vis}$ is the wavelength at which the coating had the highest average absorbance in any plane, is calculated according to the following equation:

$$AR_{\lambda i} = Ab^1_{\lambda i}/Ab^2_{\lambda i} \qquad \text{Eq. 1}$$

wherein, $AR_{\lambda i}$ is the absorption ratio at wavelength $\lambda_i$, $Ab^1_{\lambda i}$ is the average absorption at wavelength $\lambda_i$ in the polarization direction (i.e., 0° or 90°) having the higher absorbance, and $Ab^2_{\lambda i}$ is the average absorption at wavelength $\lambda_i$ in the remaining polarization direction. As previously discussed, the "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance.

The average absorption ratio ("AR") for the coating is then calculated by averaging the individual absorption ratios over the predetermined range of wavelengths (i.e., $\lambda_{max-vis}+/-5$ nanometers) according to the following equation:

$$AR = (\Sigma AR_{\lambda i})/n_i \qquad \text{Eq. 2}$$

wherein, AR is average absorption ratio for the coating, $AR_{\lambda i}$ are the individual absorption ratios (as determined above in Eq. 1) for each wavelength within the predetermined range of wavelengths, and $n_i$ is the number of individual absorption ratios averaged. A more detailed description of this method of determining the average absorption ratio is provided in the Examples.

As previously mentioned, according to various embodiments disclosed herein, the coating (ii) can comprise at least one photochromic-dichroic material that is at least partially aligned. As previously discussed, the term "photochromic-dichroic" means displaying both photochromic and dichroic (i.e., linearly polarizing) properties under certain conditions, which properties are at least detectible by instrumentation. Accordingly, "photochromic-dichroic materials" are compounds displaying both photochromic and dichroic (i.e., linearly polarizing) properties under certain conditions, which properties are at least detectible by instrumentation. Thus, photochromic-dichroic compounds have an absorption spectrum for at least visible radiation that varies in response to at least actinic radiation and are capable of absorbing one of two orthogonal plane polarized components of at least transmitted radiation more strongly than the other. Additionally, as with conventional photochromic compounds discussed above, the photochromic-dichroic compounds disclosed herein can be thermally reversible. That is, the photochromic-dichroic compounds can switch from a first state to a second state in response to actinic radiation and revert back to the first state in response to thermal energy. As used herein the term "compound" means a substance formed by the union of two or more elements, components, ingredients, or parts and includes, without limitation, molecules and macromolecules (for example polymers and oligomers) formed by the union of two or more elements, components, ingredients, or parts.

For example, according to various embodiments disclosed herein, the photochromic-dichroic compound can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the photochromic-dichroic compound can be linearly polarizing in an activated state and non-polarizing in the bleached or faded (i.e., not activated) state. As used herein, the term "activated state" refers to the photochromic-dichroic compound when exposed to sufficient actinic radiation to cause the at least a portion of the photochromic-dichroic compound to switch from a first state to a second state. Further, although not required, the photochromic-dichroic compound can be dichroic in both the first and second states. While not limiting herein, for example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state.

Although not required, according to various embodiments disclosed herein, the photochromic-dichroic compound can have an average absorption ratio of at least 1.5 in an activated state as determined according to the CELL METHOD. For example, the photochromic-dichroic compound can have an average absorption ratio greater than 2.3 in an activated state as determined according to the CELL METHOD. According to still other embodiments, the photochromic-dichroic compound can have an average absorption ratio ranging from 1.5 to 50 in an activated state as determined according to the CELL METHOD. According to other embodiments, the photochromic-dichroic compound can have an average absorption ratio ranging from 4 to 20, or from 3 to 30, or from 2.5 to 50 in an activated state as determined according to the CELL METHOD. However, generally speaking, the average absorption ratio of the photochromic-dichroic compound can be any average absorption ratio that is sufficient to impart the desired properties to the device or element. Examples of suitable photochromic-dichroic compounds are described in detail herein below.

The CELL METHOD for determining the average absorption ratio of the photochromic-dichroic compound is essentially the same as the method used to determine the average absorption ratio of the coating (described above and in the Examples), except that, instead of measuring the absorbance of a coated substrate, a cell assembly containing an aligned liquid crystal material and the photochromic-dichroic compound is tested. More specifically, the cell assembly comprises two opposing glass substrates that are spaced apart by 20 microns+/−1 micron. The substrates are sealed along two opposite edges to form a cell. The inner surface of each of the glass substrates is coated with a polyimide coating, the surface of which has been at least partially ordered by rubbing. Alignment of the photochromic-dichroic compound is achieved by introducing the photochromic-dichroic compound and the liquid crystal medium into the cell assembly, and allowing the liquid crystal medium to align with the rubbed polyimide surface. Once the liquid crystal medium and the photochromic-dichroic compound are aligned, the cell assembly is placed on an optical bench (which is described in detail in the Examples) and the average absorption ratio is determined in the manner previously described for the coated substrates, except that the unactivated absorbance of the cell assembly is subtracted from the activated absorbance to obtain the average difference absorption spectra.

As previously discussed, while dichroic compounds are capable of preferentially absorbing one of two orthogonal components of plane polarized light, it is generally necessary to suitably position or arrange the molecules of a dichroic compound in order to achieve a net linear polarization effect. Similarly, it is generally necessary to suitably position or arrange the molecules of a photochromic-dichroic compound to achieve a net linear polarization effect. That is, it is generally necessary to align the molecules of the photochromic-dichroic compound such that the long axes of the molecules of the photochromic-dichroic compound in an activated state are generally parallel to each other. Therefore, as discussed above, according to various embodiments disclosed herein, the photochromic-dichroic compound is at least partially aligned. Further, if the activated state of the photochromic-dichroic compound corresponds to a dichroic state of the material, the photochromic-dichroic compound can be at least partially aligned such that the long axis of the molecules of the photochromic-dichroic compound in the activated state are aligned. As used herein the term "align" means to bring into suitable arrangement or position by interaction with another material, compound or structure.

Further, although not limiting herein, the coating (ii) can comprise a plurality of photochromic-dichroic materials. Although not limiting herein, when two or more photochromic-dichroic compounds are used in combination, the photochromic-dichroic compounds can be chosen to complement one another to produce a desired color or hue. For example, mixtures photochromic-dichroic compounds can be used according to certain embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors. Additionally or alternatively, the coating can comprise mixtures of photochromic-dichroic compounds having complementary linear polarization states. For example, the photochromic-dichroic compounds can be chosen to have complementary linear polarization states over a desired range of wavelengths to produce an optical element that is capable of polarizing light over the desired range of wavelengths. Still further, mixtures of complementary photochromic-dichroic compounds having essentially the same polarization states at the same wavelengths can be chosen to reinforce or enhance the overall linear polarization achieved. For example, according to one embodiment, the coating having the first state and the second state can comprise at least two at least partially aligned photochromic-dichroic compounds, wherein the photochromic-dichroic compounds have complementary colors and/or complementary linear polarization states.

As previously discussed, various embodiments disclosed herein provide an optical element comprising a coating connected to a substrate, wherein the coating is operable to switch from a first state to a second state in response to actinic radiation, to revert back to the first state in response to thermal energy, and to linearly polarize at least transmitted radiation in at least one of the first state and the second state. Further, according to various embodiments, the coating can comprise a photochromic-dichroic compound that is at least partially aligned.

Additionally, according to various embodiments disclosed herein, the coating (ii) can further comprise at least one additive that may facilitate one or more of the processing, the properties, or the performance of the coating. Examples of such additives include dyes, alignment promoters, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, self-assembling materials, gelators, and adhesion promoters (such as hexanediol diacrylate and coupling agents).

Examples of dyes that can be present in the coating according to various embodiments disclosed herein include organic dyes that are capable of imparting a desired color or other optical property to the coating.

As used herein, the term "alignment promoter" means an additive that can facilitate at least one of the rate and uniformity of the alignment of a material to which it is added. Examples of alignment promoters that can be present in the coatings according to various embodiments disclosed herein include those described in U.S. Pat. No. 6,338,808 and U.S. Patent Publication No. 2002/0039627, which are hereby specifically incorporated by reference herein.

Examples of kinetic enhancing additives that can be present in the coating according to various embodiments disclosed herein include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby specifically incorporated by reference herein.

Examples of photoinitiators that can be present in the coating according to various embodiments disclosed herein include cleavage-type photoinitiators and abstraction-type photoinitiators. Examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Examples of abstraction-type photoinitiators include benzophenone, Michler's ketone, thioxanthone, anthraquinone, camphorquinone, fluorone, ketocoumarin or mixtures of such initiators.

Another example of a photoinitiator that can be present in the coating according to various embodiments disclosed herein is a visible light photoinitiator. Examples of suitable visible light photoinitiators are set forth at column 12, line 11 to column 13, line 21 of U.S. Pat. No. 6,602,603, which is specifically incorporated by reference herein.

Examples of thermal initiators include organic peroxy compounds and azobis(organonitrile) compounds. Specific examples of organic peroxy compounds that are useful as thermal initiators include peroxymonocarbonate esters, such as tertiarybutylperoxy isopropyl carbonate; peroxydicarbonate esters, such as di(2-ethylhexyl) peroxydicarbonate, di(s-econdary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one embodiment the thermal initiators used are those that do not discolor the resulting polymerizate. Examples of azobis(organonitrile) compounds that can be used as thermal initiators include azobis(isobutyronitrile), azobis(2,4-dimethylvaleronitrile) or a mixture thereof.

Examples of polymerization inhibitors include: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, di-tertiary butyl phenol, 1,2,3-trihydroxybenzene, and 2,4,6-trimethylphenol.

Examples of solvents that can be present in the coating according to various embodiments disclosed herein include those that will dissolve solid components of the coating, that are compatible with the coating and the elements and substrates, and/or can ensure uniform coverage of the exterior surface(s) to which the coating is applied. Potential solvents include, but are not limited to, the following: propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

Examples of self-assembling materials include liquid crystal materials and/or block copolymers.

Rheology control agents are thickeners that are typically powders that may be inorganic, such as silica, organic such as microcrystalline cellulose, hydroxy stearic acid or particulate polymeric materials. Gelators or gelling agents are often organic materials that can also affect the thixotropy of the material in which they are added. Non-limiting examples of suitable gelators or gelling agents include, but are not limited to, natural gums, starches, pectins, agar-agar, and gelatins. Gelators or gelling agents may often be based on polysaccharides or proteins.

In another embodiment, the coating (ii) can further comprise at least one conventional dichroic compound. Examples of suitable conventional dichroic compounds include azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodates. In another embodiment, the dichroic material can be a polymerizable dichroic compound. That is, the dichroic material can comprise at least one group that is capable of being polymerized (i.e., a "polymerizable group"). For example, although not limiting herein, in one embodiment the dichroic compound can have at least one alkoxy, polyalkoxy, alkyl, or polyalkyl substituent terminated with at least one polymerizable group.

Still further, the coating (ii) can comprise at least one conventional photochromic compound. As used herein, the term "conventional photochromic compound" includes both thermally reversible and non-thermally reversible (or photoreversible) photochromic compounds. Generally, although not limiting herein, when two or more conventional photochromic materials are used in combination with each other or with a photochromic-dichroic compound, the various materials can be chosen to complement one another to produce a desired color or hue. For example, mixtures of photochromic compounds can be used according to certain embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

The optical elements according to various embodiments disclosed herein can further comprise at least one additional coating that can facilitate bonding, adhering, or wetting of any of the various coatings connected to the substrate of the optical element. For example, according to one embodiment, the optical element can comprise an at least partial primer coating between the coating having the first state and the second state and a portion of the substrate. Further, in some embodiments disclosed herein, the primer coating can serve as a barrier coating to prevent interaction of the coating ingredients with the element or substrate surface and vice versa.

Examples of primer coatings that can be used in conjunction with various embodiments disclosed herein include coatings comprising coupling agents, at least partial hydrolysates of coupling agents, and mixtures thereof. As used herein "coupling agent" means a material having at least one group capable of reacting, binding and/or associating with a group on at least one surface. In one embodiment, a coupling agent can serve as a molecular bridge at the interface of at least two surfaces that can be similar or dissimilar surfaces. Coupling agents, in another embodiment, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed. In addition to coupling agents and/or hydrolysates of coupling agents, the primer coatings can comprise other adhesion enhancing ingredients. For example, although not limiting herein, the primer coating can further comprise an adhesion-enhancing amount of an epoxy-containing material. Adhesion-enhancing amounts of epoxy-containing materials when added to the coupling agent containing coating composition can improve the adhesion of a subsequently applied coating as compared to a coupling agent containing coating composition that is essentially free of the epoxy-containing material. Other examples of primer coatings that are suitable for use in conjunction with the various embodiments disclosed herein include those described U.S. Pat. No. 6,602,603 and U.S. Pat. No. 6,150,430, which are hereby specifically incorporated by reference.

The optical elements according to various embodiments disclosed herein can further comprise at least one additional coating chosen from conventional photochromic coatings, anti-reflective coatings, linearly polarizing coatings, circularly polarizing coatings, elliptically polarizing coatings, transitional coatings, primer coatings (such as those discussed above), and protective coatings such as antifogging coatings, oxygen barrier coatings, and ultraviolet light absorbing coatings connected to at least a portion of the substrate. For example, although not limiting herein, the additional coating(s) can be over at least a portion of the coating (ii), i.e., as an overcoating; or under at least a portion of the coating (ii), i.e., as an undercoating. Additionally or alternatively, the coating (ii) can be connected to a first surface of the substrate and the additional coating can be connected to a second surface of the substrate, wherein the first surface is opposite the second surface. Note again that the coatings need not cover an entire surface.

Examples of conventional photochromic coatings include coatings comprising any of the conventional photochromic compounds that are discussed in detail below. For example, although not limiting herein, the photochromic coatings can be photochromic polyurethane coatings, such as those described in U.S. Pat. No. 6,187,444; photochromic aminoplast resin coatings, such as those described in U.S. Pat. Nos. 4,756,973, 6,432,544 and 6,506,488; photochromic polysilane coatings, such as those described in U.S. Pat. No. 4,556,605; photochromic poly(meth)acrylate coatings, such as those described in U.S. Pat. Nos. 6,602,603, 6,150,430 and 6,025,026, and WIPO Publication WO 01/02449; polyanhydride photochromic coatings, such as those described in U.S. Pat. No. 6,436,525; photochromic polyacrylamide coatings such as those described in U.S. Pat. No. 6,060,001; photochromic epoxy resin coatings, such as those described in U.S. Pat. Nos. 4,756,973 and 6,268,055; and photochromic poly (urea-urethane) coatings, such as those described in U.S. Pat. No. 6,531,076. The specifications of the aforementioned U.S. patents and international publications are hereby specifically incorporated by reference herein.

Examples of linearly polarizing coatings include, but are not limited to, coatings comprising conventional dichroic compounds such as, but not limited to, those discussed above.

As used herein the term "transitional coating" means a coating that aids in creating a gradient in properties between two coatings. For example, although not limiting herein, a transitional coating can aid in creating a gradient in hardness between a relatively hard coating and a relatively soft coating. Examples of transitional coatings include radiation-cured acrylate-based thin films.

Examples of protective coatings include abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. For example, according to one embodiment, the protective coating can comprise a first coating of a radiation-cured acrylate-based thin film and a second coating comprising an organo-silane. Examples of commercial protective coatings products include SILVUE® 124 and HI-GARD® coatings, available from SDC Coatings, Inc. and PPG Industries, Inc., respectively.

Other embodiments disclosed herein provide an optical element comprising a substrate and an at least partially aligned photochromic-dichroic compound connected to the substrate and having an average absorption ratio greater than 2.3 in an activated state as determined according to the CELL METHOD. Further, according to various embodiments disclosed herein, the absorption ratio of the at least partially aligned photochromic-dichroic compound can range from 4 to 20, can further range from 3 to 30, and can still further range from 2.5 to 50 or greater.

As previously discussed, the term "connected to" means in direct contact with an object or indirect contact with an object through one or more other structures, at least one of which is in direct contact with the object. Thus, according to the above-mentioned embodiments, the photochromic-dichroic compound connected to the substrate can be in direct contact with the substrate, or it can be in contact with one or more other structures or materials that are in direct or indirect contact with the substrate. For example, although not limiting herein, in one embodiment, the photochromic-dichroic compound can be present as part of a coating or polymeric sheet that is in direct contact with the at least a portion of the substrate. In another embodiment, the photochromic-dichroic compound can be present as part of a coating or a sheet that is in direct contact with one or more other coatings or sheets, at least one of which is in direct contact with the substrate.

According to still other embodiments, the photochromic-dichroic compound can be contained in an at least partially ordered liquid crystal material that is in direct (or indirect) contact with the substrate. Further, according to this embodiment, the optical element can comprise two substrates and the at least partially ordered liquid crystal material containing the photochromic-dichroic compound can be positioned between the two substrates, for example, to form an active or a passive liquid crystal cell.

In a still further non-limiting embodiment, the present invention comprises an optical element being a circular polarizer connected to a substrate that is a packaging material for light-sensitive products.

Examples of photochromic-dichroic compounds suitable for used in conjunction with various embodiments disclosed herein include the compounds listed below and the compounds described in U.S. Pat. No. 7,256,921 in column 19, line 26 to column 22, line 47:

(1) 3-phenyl-3-(4-(4-(3-piperidin-4-yl-propyl)piperidino) phenyl)-13,13-dimethyl-indeno[2',3':3,4]-naphtho[1,2-b] pyran;

(2) 3-phenyl-3-(4-(4-(3-(1-(2-hydroxyethyl)piperidin-4-yl) propyl)piperidino)phenyl)-13,13-dimethyl-indeno[2',3':3, 4]naphtho[1,2-b]pyran;

(3) 3-phenyl-3-(4-(4-(4-butyl-phenylcarbamoyl)-piperidin-1-yl)phenyl)-13,13-dimethyl-6-methoxy-7-(4-phenyl-piperazin-1-yl)indeno[2',3':3,4]naphtho[1,2-b]pyran;

(4) 3-phenyl-3-(4-([1,4']bipiperidinyl-1'-yl)phenyl)-13,13-dimethyl-6-methoxy-7-([1,4']bipiperidinyl-1'-yl)indeno [2',3':3,4]naphtho[1,2-b]pyran;

(5) 3-phenyl-3-(4-(4-phenyl-piperazin-1-yl)phenyl)-13,13-dimethyl-6-methoxy-7-(4-(4-hexylbenzoyloxy)-piperidin-1-yl)indeno[2',3':3,4]naphtho[1,2-b]pyran; and (6) 3-phenyl-3-(4-(4-phenyl-piperazin-1-yl)phenyl)-13,13-dimethyl-6-methoxy-7-(4-(4'-octyloxy-biphenyl-4-carbonyloxy)-piperidin-1-yl)indeno[2',3':3,4]naphtho[1,2-b] pyran;

More generally, such photochromic-dichroic compounds comprise: (a) at least one photochromic group (PC) chosen from pyrans, oxazines, and fulgides; and (b) at least one lengthening agent attached to the photochromic group, wherein the lengthening agent (L) is represented by the following Formula I (which is described in detail below):

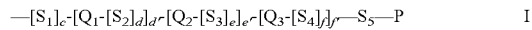

$$-[S_1]_c-[Q_1-[S_2]_d]_{d'}-[Q_2-[S_3]_e]_{e'}-[Q_3-[S_4]_f]_{f'}-S_5-P \qquad \text{I}$$

As used herein, the term "attached" means directly bonded to or indirectly bonded to through another group. Thus, for example, according to various embodiments disclosed herein, L can be directly bonded to PC as a substituent on PC, or L can be a substituent on another group (such as a group represented by $R^1$, which is discussed below) that is directly bonded to PC (i.e., L is indirectly bonded to PC). Although not limiting herein, according to various embodiments, L can be attached to PC so as to extend or lengthen PC in an activated state such that the absorption ratio of the extended PC (i.e., the photochromic compound) is enhanced as compared to PC alone. Although not limiting herein, according to various embodiments, the location of attachment of L on PC can be chosen such that L lengthens PC in at least one of a direction parallel to and a direction perpendicular to a theoretical transitional dipole moment of the activated form of PC.

As used herein the term "theoretical transitional dipole moment" refers to transient dipolar polarization created by interaction of electromagnetic radiation with the molecule. See, for example, *IUPAC Compendium of Chemical Technology*, 2$^{nd}$ Ed., International Union of Pure and Applied Chemistry (1997).

With reference to Formula I above, each $Q_1$, $Q_2$, and $Q_3$ can be independently chosen for each occurrence from: a divalent group chosen from an unsubstituted or a substituted aromatic group, an unsubstituted or a substituted alicyclic group, an unsubstituted or a substituted heterocyclic group, and mixtures thereof, wherein substituents are chosen from: a group represented by P (as set forth below), liquid crystal mesogens, halogen, poly($C_1$-$C_{18}$ alkoxy), $C_1$-$C_{18}$ alkoxycarbonyl, $C_1$-$C_{18}$ alkylcarbonyl, $C_1$-$C_{18}$ alkoxycarbonyloxy, aryloxycarbonyloxy, perfluoro($C_1$-$C_{18}$)alkoxy, perfluoro($C_1$-$C_{18}$) alkoxycarbonyl, perfluoro($C_1$-$C_{18}$)alkylcarbonyl, perfluoro ($C_1$-$C_{18}$)alkylamino, di-(perfluoro($C_1$-$C_{18}$)alkyl)amino, perfluoro($C_1$-$C_{18}$)alkylthio, $C_1$-$C_{18}$ alkylthio, $C_1$-$C_{18}$ acetyl, $C_3$-$C_{10}$ cycloalkyl, $C_3$-$C_{10}$ cycloalkoxy, a straight-chain or branched $C_1$-$C_{18}$ alkyl group that is mono-substituted with cyano, halo, or $C_1$-$C_{18}$ alkoxy, or poly-substituted with halo, and a group represented by one of the following formulae: -M(T)$_{(t-1)}$ and -M(OT)$_{(t-1)}$ wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M. As used herein, the prefix "poly" means at least two.

As discussed above, $Q_1$, $Q_2$, and $Q_3$ can be independently chosen for each occurrence from a divalent group, such as an unsubstituted or a substituted aromatic group, unsubstituted or substituted heterocyclic group, and an unsubstituted or substituted alicyclic group. Examples of useful aromatic groups include: benzo, naphtho, phenanthro, biphenyl, tetrahydro naphtho, terphenyl, and anthraceno.

As used herein the term "heterocyclic group" means a compound having a ring of atoms, wherein at least one atom forming the ring is different than the other atoms forming the ring. Further, as used herein, the term heterocyclic group specifically excludes fused heterocyclic groups. Examples of suitable heterocyclic groups from which $Q_1$, $Q_2$, and $Q_3$ can be chosen include: isosorbitol, dibenzofuro, dibenzothieno, benzofuro, benzothieno, thieno, furo, dioxino, carbazolo, anthranilyl, azepinyl, benzoxazolyl, diazepinyl, dioazlyl, imidazolidinyl, imidazolyl, imidazolinyl, indazolyl, indoleninyl, indolinyl, indolizinyl, indolyl, indoxazinyl, isobenzazolyl, isoindolyl, isooxazolyl, isooxazyl, isopyrroyl, isoquinolyl, isothiazolyl, morpholino, morpholinyl, oxadiazolyl, oxathiazolyl, oxathiazyl, oxathiolyl, oxatriazolyl, oxazolyl, piperazinyl, piperazyl, piperidyl, purinyl, pyranopyrrolyl, pyrazinyl, pyrazolidinyl, pyrazolinyl, pyrazolyl, pyrazyl, pyridazinyl, pyridazyl, pyridyl, pyrimidinyl, pyrimidyl, pyridenyl, pyrrolidinyl, pyrrolinyl, pyrroyl, quinolizinyl, quinuclidinyl, quinolyl, thiazolyl, triazolyl, triazyl, N-arylpiperazino, aziridino, arylpiperidino, thiomorpholino, tetrahydroquinolino, tetrahydroisoquinolino, pyrryl, unsubstituted, mono- or di-substituted $C_4$-$C_{18}$ spirobicyclic amines, and unsubstituted, mono- or di-substituted $C_4$-$C_{18}$ spirotricyclic amines.

As discussed above, $Q_1$, $Q_2$, and $Q_3$ can be chosen from mono- or di-substituted $C_4$-$C_{18}$ spirobicyclic amine and $C_4$-$C_{18}$ spirotricyclic amine. examples of suitable substituents include aryl, $C_1$-$C_6$ alkyl, $C_1$-$C_6$ alkoxy or phenyl ($C_1$-$C_6$)alkyl. Specific examples of mono- or di-substituted spirobicyclic amines include: 2-azabicyclo[2.2.1]hept-2-yl; 3-azabicyclo[3.2.1]oct-3-yl; 2-azabicyclo[2.2.2]oct-2-yl; and 6-azabicyclo[3.2.2]nonan-6-yl. Specific examples of mono- or di-substituted tricyclic amines include: 2-azatricyclo[3.3.1.1 (3,7)]decan-2-yl; 4-benzyl-2-azatricyclo[3.3.1.1 (3,7)]decan-2-yl; 4-methoxy-6-methyl-2-azatricyclo[3.3.1.1 (3,7)]decan-2-yl; 4-azatricyclo[4.3.1.1(3,8)]undecan-4-yl; and 7-methyl-4-azatricyclo[4.3.1.1 (3,8)]undecan-4-yl. Examples of alicyclic groups from which $Q_1$, $Q_2$, and $Q_3$ can be chosen include, without limitation, cyclohexyl, cyclopropyl, norbornenyl, decalinyl, adamantanyl, bicycloctane, perhydrofluorene, and cubanyl.

With continued reference to Formula I, each $S_1$, $S_2$, $S_3$, $S_4$, and $S_5$ can be independently chosen for each occurrence from a spacer unit chosen from:

(1) —(CH$_2$)$_g$—, —(CF$_2$)$_h$—, —Si(CH$_2$)$_g$—, —(Si[(CH$_3$)$_2$]O)$_h$—, wherein g is independently chosen for each occurrence from 1 to 20; h is chosen from 1 to 16;

(2) —N(Z)-, —C(Z)=C(Z)-, —C(Z)=N—, —C(Z')-C(Z')- or a single bond, wherein Z is independently chosen for each occurrence from hydrogen, $C_1$-$C_{18}$ alkyl, $C_3$-$C_{10}$ cycloalkyl and aryl, and Z' is independently chosen for each occurrence from $C_1$-$C_{18}$ alkyl, $C_3$-$C_{10}$cycloalkyl and aryl; and (3) —O—, —C(O)—, —C≡C—, —N=N—, —S—, —S(O)—, —S(O)(O)—, —(O)S(O)O—, —O(O)S(O)O— or straight-chain or branched $C_1$-$C_{24}$ alkylene residue, said $C_1$-$C_{24}$ alkylene residue being unsubstituted, mono-substituted by cyano or halo, or poly-substituted by halo;

provided that when two spacer units comprising heteroatoms are linked together the spacer units are linked so that heteroatoms are not directly linked to each other and when $S_1$ and $S_5$ are linked to PC and P, respectively, they are linked so that two heteroatoms are not directly linked to each other. As used herein the term "heteroatom" means atoms other than carbon or hydrogen.

Further, in Formula I, according to various embodiments, c, d, e, and f each can be independently chosen from an integer ranging from 1 to 20, inclusive; and d', e' and f' each can be independently chosen from 0, 1, 2, 3, and 4, provided that the sum of d'+e'+f' is at least 1. According to other embodiments, c, d, e, and f each can be independently chosen from an integer ranging from 0 to 20, inclusive; and d', e' and f' each can be independently chosen from 0, 1, 2, 3, and 4, provided that the sum of d'+e'+f' is at least 2. According to still other embodiments, c, d, e, and f each can be independently chosen from an integer ranging from 0 to 20, inclusive; and d', e' and f' each can be independently chosen from 0, 1, 2, 3, and 4, provided that the sum of d'+e'+f' is at least 3. According to still other embodiments, c, d, e, and f each can be independently chosen from an integer ranging from 0 to 20, inclusive; and d', e' and f' each can be independently chosen from 0, 1, 2, 3, and 4, provided that the sum of d'+e'+f' is at least 1.

Further, in Formula I, P can be chosen from: hydroxy, amino, $C_2$-$C_{18}$ alkenyl, $C_2$-$C_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl ($C_1$-$C_{18}$)alkyl, $C_1$-$C_{18}$ alkyloxycarbonyloxy, halocarbonyl, hydrogen, aryl, hydroxy($C_1$-$C_{18}$)alkyl, $C_1$-$C_{18}$ alkyl, $C_1$-$C_{18}$ alkoxy, amino($C_1$-$C_{18}$)alkyl, $C_1$-$C_{18}$ alkylamino, di-($C_1$-$C_{18}$) alkylamino, $C_1$-$C_{18}$ alkyl($C_1$-$C_{18}$)alkoxy, $C_1$-$C_{18}$ alkoxy($C_1$-$C_{18}$)alkoxy, nitro, poly($C_1$-$C_{18}$)alkyl ether, ($C_1$-$C_{18}$)alkyl ($C_1$-$C_{18}$)alkoxy($C_1$-$C_{18}$)alkyl, polyethyleneoxy, polypropyleneoxy, ethylenyl, acryloyl, acryloyloxy($C_1$-$C_{18}$) alkyl, methacryloyl, methacryloyloxy($C_1$-$C_{18}$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$)alkoxy, fluoro($C_1$-$C_{18}$)alkyl, cyano, cyano($C_1$-$C_{18}$)alkyl, cyano($C_1$-$C_{18}$)alkoxy or mixtures thereof, or P is a structure having from 2 to 4 reactive groups or P is an unsubstituted or substituted ring opening metathesis polymerization precursor.

Further, although not limiting herein, when P is a polymerizable group, the polymerizable group can be any functional group adapted to participate in a polymerization reaction. examples of polymerization reactions include those described in the definition of "polymerization" in *Hawley's Condensed Chemical Dictionary Thirteenth Edition*, 1997, John Wiley & Sons, pages 901-902, which disclosure is incorporated herein by reference. For example, although not limiting herein, polymerization reactions include: "addition polymerization," in which free radicals are the initiating agents that react with the double bond of a monomer by adding to it on one side at the same time producing a new free electron on the other side; "condensation polymerization," in which two reacting molecules combine to form a larger molecule with elimination of a small molecule, such as a water molecule; and "oxidative coupling polymerization." Further, examples of polymerizable groups include hydroxy, acryloxy, methacryloxy, 2-(acryloxy)ethylcarbamyl, 2-(methacryloxy)ethylcarbamyl, isocyanate, aziridine, allylcarbonate, and epoxy, e.g., oxiranylmethyl.

Moreover, P can be chosen from a main-chain or a side-chain liquid crystal polymer and a liquid crystal mesogen. As used herein, the term liquid crystal "mesogen" means rigid rod-like or disc-like liquid crystal molecules. Further, as used herein the term "main-chain liquid crystal polymer" refers to a polymer having liquid crystal mesogens within the backbone (i.e., the main chain) structure of the polymer. As used herein the term "side-chain liquid crystal polymer" refers to a polymer having liquid crystal mesogens attached to the polymer at the side chains. Although not limiting herein, generally, the mesogens are made up of two or more aromatic rings that restrict the movement of a liquid crystal polymer. Examples of suitable rod-like liquid crystal mesogens include without limitation: substituted or unsubstituted aromatic esters, substituted or unsubstituted linear aromatic compounds, and substituted or unsubstituted terphenyls. According to another specific embodiment, P can be chosen from a steroid, for example and without limitation, a cholesterolic compound.

Examples of thermally reversible photochromic pyrans from which the photochromic group PC can be chosen include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767, and heterocyclic-fused naphthopyrans, such as those disclosed in U.S. Pat. Nos. 5,723,072, 5,698,141, 6,153,126, and 6,022,497, which are hereby incorporated by reference; spiro-9-fluoreno[1,2-b]pyrans; phenanthropyrans; quinopyrans; fluoroanthenopyrans; spiropyrans, e.g., spiro(benzindoline) naphthopyrans, spiro(indoline)benzopyrans, spiro(indoline) naphthopyrans, spiro(indoline)quinopyrans and spiro(indoline)pyrans. More specific examples of naphthopyrans and the complementary organic photochromic substances are described in U.S. Pat. No. 5,658,501, which are hereby specifically incorporated by reference herein. Spiro(indoline) pyrans are also described in the text, *Techniques in Chemistry*, Volume III, "Photochromism", Chapter 3, Glenn H. Brown, Editor, John Wiley and Sons, Inc., New York, 1971, which is hereby incorporated by reference.

Examples of photochromic oxazines from which PC can be chosen include benzoxazines, naphthoxazines, and spiro-oxazines, e.g., spiro(indoline)naphthoxazines, spiro(indoline) pyridobenzoxazines, spiro(benzindoline)pyridobenzoxazines, spiro(benzindoline)naphthoxazines, spiro(indoline) benzoxazines, spiro(indoline)fluoranthenoxazine, and spiro (indoline)quinoxazine. examples of photochromic fulgides from which PC can be chosen include: fulgimides, and the 3-furyl and 3-thienyl fulgides and fulgimides, which are disclosed in U.S. Pat. No. 4,931,220 (which are hereby specifically incorporated by reference) and mixtures of any of the aforementioned photochromic materials/compounds.

Further, wherein the photochromic-dichroic compound comprises at least two PCs, the PCs can be linked to one another via linking group substituents on the individual PCs. For example, the PCs can be polymerizable photochromic groups or photochromic groups that are adapted to be compatible with a host material ("compatibilized photochromic group"). Examples of polymerizable photochromic groups from which PC can be chosen and that are useful in conjunction with various embodiments disclosed herein are disclosed in U.S. Pat. No. 6,113,814, which is hereby specifically incorporated by reference herein. Examples of compatibilized photochromic groups from which PC can be chosen and that are useful in conjunction with various embodiments disclosed herein are disclosed in U.S. Pat. No. 6,555,028, which is hereby specifically incorporated by reference herein.

Other suitable photochromic groups and complementary photochromic groups are described in U.S. Pat. Nos. 6,080, 338 at column 2, line 21 to column 14, line 43; 6,136,968 at column 2, line 43 to column 20, line 67; 6,296,785 at column 2, line 47 to column 31, line 5; 6,348,604 at column 3, line 26 to column 17, line 15; 6,353,102 at column 1, line 62 to column 11, line 64; and 6,630,597 at column 2, line 16 to column 16, line 23; the disclosures of the aforementioned patents are incorporated herein by reference.

In addition to at least one lengthening agent (L), the photochromic compounds can further comprise at least one group represented by $R^1$ that is directly bonded to PC. Although not required, as previously discussed, the at least one lengthening agent (L) can be indirectly bonded to PC through the at least one group represented by $R^1$. That is, L can be a substituent on at least one group $R^1$ that is bonded to PC. According to various embodiments disclosed herein, $R^1$ can be independently chosen for each occurrence from substituents disclosed in U.S. Pat. No. 7,256,921 from column 26, line 60 to column 30, line 64. The photochromic-dichroic compounds of the present invention include the compounds and methods of preparation disclosed in U.S. Pat. No. 7,256,921 from column 30, line 65 to column 66, line 60.

As previously discussed, one embodiment disclosed herein provides an optical element comprising a substrate and at least one at least partially aligned photochromic-dichroic compound connected to at least a portion of the substrate and having an average absorption ratio greater than 2.3 in an activated state as determined according to the CELL METHOD. Additionally, according to this embodiment, the optical element can further comprise at least one orientation facility having a at least a first general direction connected to at least a portion of the substrate, and at least a portion of the at least one at least partially aligned photochromic-dichroic compound can be at least partially aligned by interaction with the orientation facility.

As used herein the term "orientation facility" means a mechanism that can facilitate the positioning of one or more other structures that are exposed, directly and/or indirectly, to at least a portion thereof. As used herein the term "order" means bring into a suitable arrangement or position, such as aligning with another structure or material, or by some other force or effect. Thus, as used herein the term "order" encompasses both contact methods of ordering a material, such as by aligning with another structure or material, and non-contact methods of ordering a material, such as by exposure to an external force or effect. The term order also encompasses combinations of contact and non-contact methods.

For example, in one embodiment, the portion of the partially aligned photochromic-dichroic compound that is at least partially aligned by interaction with the orientation facility can be at least partially aligned such that the long-axis of the photochromic-dichroic compound in the activated state is essentially parallel to the first general direction of the orientation facility. According to another embodiment, the portion of the partially aligned photochromic-dichroic compound that is at least partially aligned by interaction with a portion of the orientation facility is bound to or reacted with the portion of the orientation facility. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

As discussed above, the orientation facilities according to various embodiments disclosed herein can have at least a first general direction. For example, the orientation facility can comprise a first ordered region having a first general direction and at least one second ordered region adjacent the first ordered region having a second general direction that is different from the first general direction. Further, the orientation facility can have a plurality of regions, each of which has a general direction that is the same or different from the remaining regions so as to form a desired pattern or design. Additionally, the at least one orientation facility can comprise one or more different types of orientation facilities. Examples of orientation facilities that can be used in conjunction with this and other embodiments disclosed herein include at least partial coatings comprising an at least partially ordered alignment medium, at least partially ordered polymer sheets, at least partially treated surfaces, Langmuir-Blodgett films, and combinations thereof.

For example, although not limiting herein, according to one embodiment, the orientation facility can comprise a coating comprising an at least partially ordered alignment medium. Examples of suitable alignment media that can be used in conjunction with various embodiments disclosed herein include photo-orientation materials, rubbed-orientation materials, and liquid crystal materials. Methods of ordering at least a portion of the alignment medium are described herein below in detail.

As discussed above, according to various embodiments, the alignment medium can be a liquid crystal material. Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, although not limiting herein, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. That is, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface. Examples of liquid crystal materials suitable for use as alignment media according to various embodiments disclosed herein include liquid crystal polymers, liquid crystal pre-polymers, liquid crystal monomers, and liquid crystal mesogens. As used herein the term "pre-polymer" means partially polymerized materials.

Liquid crystal monomers that are suitable for use in conjunction with various embodiments disclosed herein include mono- as well as multi-functional liquid crystal monomers. Further, according to various embodiments disclosed herein, the liquid crystal monomer can be a cross-linkable liquid crystal monomer, and can further be a photocross-linkable liquid crystal monomer. As used herein the term "photocross-linkable" means a material, such as a monomer, a pre-polymer or a polymer that can be cross-linked on exposure to actinic radiation. For example, photocross-linkable liquid crystal monomers include those liquid crystal monomers that are cross-linkable on exposure to ultraviolet radiation and/or visible radiation, either with or without the use of polymerization initiators.

Examples of cross-linkable liquid crystal monomers suitable for use in accordance with various embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Examples of photocross-linkable liquid crystal monomers suitable for use in the coatings of the alignment facilities according to various embodiments disclosed herein include liquid crystal monomers having functional groups chosen from acrylates, methacrylates, alkynes, epoxides, thiols, and blends thereof.

Liquid crystal polymers and pre-polymers that are suitable for use in conjunction with various embodiments disclosed herein include main-chain liquid crystal polymers and pre-polymers and side-chain liquid crystal polymers and pre-polymers. In main-chain liquid crystal polymers and pre-polymers, rod- or disc-like liquid crystal mesogens are primarily located within the polymer backbone. In side-chain polymers and pre-polymers, the rod- or disc-like liquid crystal mesogens primarily are located within the side chains of the polymer. Additionally, according to various embodiments disclosed herein, the liquid crystal polymer or pre-polymer can be cross-linkable, and further can be photocross-linkable.

Examples of liquid crystal polymers and pre-polymers that are suitable for use in accordance with various embodiments disclosed herein include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal polymers and pre-polymers that are suitable for use in the coatings of the alignment facilities according to various embodiments disclosed herein include those polymers and pre-polymers having functional groups chosen from acrylates, methacrylates, alkynes, epoxides, thiols, and blends thereof.

Liquid crystals mesogens that are suitable for use in conjunction with various embodiments disclosed herein include thermotropic liquid crystal mesogens and lyotropic liquid crystal mesogens. Further, examples of liquid crystal mesogens that are suitable for use in conjunction with various embodiments disclosed herein include columatic (or rod-like) liquid crystal mesogens and discotic (or disc-like) liquid crystal mesogens.

Examples of photo-orientation materials that are suitable for use as an alignment medium in conjunction with various embodiments disclosed include photo-orientable polymer networks. Specific examples of suitable photo-orientable polymer networks include azobenzene derivatives, cinnamic acid derivatives, coumarine derivatives, ferulic acid derivatives, and polyimides. For example, according to one embodiment, the orientation facility can comprise at least one at least partial coating comprising an at least partially ordered photo-orientable polymer network chosen from azobenzene derivatives, cinnamic acid derivatives, coumarine derivatives, ferulic acid derivatives, and polyimides. Specific examples of cinnamic acid derivatives that can be used as an alignment medium in conjunction with various embodiments disclosed herein include polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, although not limiting herein, in one embodiment, the rubbed-orientation material can be rubbed with a suitably textured cloth or a velvet brush. Examples of rubbed-orientation materials that are suitable for use as an alignment medium in conjunction with various embodiments disclosed herein include (poly)imides, (poly)siloxanes, (poly)acrylates, and (poly)coumarines. Thus, for example, although not limiting herein, the coating comprising the alignment medium can be a coating comprising a polyimide that has been rubbed with velvet or a cloth so as to at least partially order at least a portion of the surface of the polyimide.

As discussed above, the at least one orientation facility according to certain embodiments disclosed herein can comprise an at least partially ordered polymer sheet. For example, although not limiting herein, a sheet of polyvinyl alcohol can be at least partially ordered by stretching the sheet, and thereafter the sheet can be bonded to the at least a portion a surface of the optical substrate to form the orientation facility. Alternatively, the ordered polymer sheet can be made by a method that at least partially orders the polymer chains during fabrication, for example and without limitation, by extrusion. Further, the at least partially ordered polymer sheet can be formed by casting or otherwise forming a sheet of a liquid crystal material and thereafter at least partially ordering the sheet for example, but exposing the sheet to at least one of a magnetic field, an electric field, or a shear force. Still further, the at least partially ordered polymer sheet can be made using photo-orientation methods. For example and without limitation, a sheet of a photo-orientation material can be formed, for example by casting, and thereafter at least partially ordered by exposure to linearly polarized ultraviolet radiation. Still other methods of forming at least partially ordered polymer sheets are described herein below.

Still further, the orientation facilities according to various embodiments disclosed herein can comprise an at least partially treated surface. As used herein, the term "treated surface" refers to at least a portion of a surface that has been physically altered to create at least one ordered region on least a portion of the surface. Examples of at least partially treated surfaces include at least partially rubbed surfaces, at least partially etched surfaces, and at least partially embossed surfaces. Further, the at least partially treated surfaces can be patterned, for example using a photolithographic or an interferographic process. Examples of at least partially treated surfaces that are useful in forming the orientation facilities according to various embodiments disclosed herein include, chemically etched surfaces, plasma etched surfaces, nano-etched surfaces (such as surfaces etched using a scanning tunneling microscope or an atomic force microscope), laser etched surfaces, and electron-beam etched surfaces.

In one specific embodiment, wherein the orientation facility comprises an at least partially treated surface, imparting the orientation facility can comprise depositing a metal salt (such as a metal oxide or metal fluoride) onto at least a portion of a surface, and thereafter etching the deposit to form the orientation facility. Examples of suitable techniques for depositing a metal salt include plasma vapor deposition, chemical vapor deposition, and sputtering. Examples of etching processes are set forth above.

As used herein the term "Langmuir-Blodgett films" means one or more at least partially ordered molecular films on a surface. For example, although not limiting herein, a Langmuir-Blodgett film can be formed by dipping a substrate into a liquid one or more times so that it is at least partially covered by a molecular film and then removing the substrate from the liquid such that, due to the relative surface tensions of the liquid and the substrate, the molecules of the molecular film are at least partially ordered in a general direction. As used herein, the term molecular film refers to monomolecular films (i.e., monolayers) as well as films comprising more than one monolayer.

In addition to the orientation facilities described above, the optical elements according to various embodiments disclosed herein can further comprise at least one coating comprising an at least partially ordered alignment transfer material interposed between the orientation facility and the photochromic-dichroic compound (or coating comprising the same). Still further, the optical elements can comprise a plurality of coatings comprising an alignment transfer interposed between the orientation facility and the photochromic-dichroic compound. For example, although not limiting herein, the optical element can comprise at least one orientation facility comprising a coating comprising an at least partially ordered alignment medium connected to the optical substrate, and a coating comprising an at least partially ordered alignment transfer material connected to the orientation facility. Further, according to this embodiment, the photochromic-dichroic compound can be at least partially aligned by interaction with the alignment transfer material. More specifically, although not limiting herein, in one embodiment, at least a portion of the alignment transfer material can be aligned by interaction with at least a portion of the alignment medium, and at least a portion of the photochromic-dichroic compound can be aligned by interaction with the at least a partially aligned portion of the alignment transfer material. That is, the alignment transfer material can facilitate the propagation or transfer of a suitable arrangement or position from the orientation facility to the photochromic-dichroic compound.

Examples of alignment transfer materials that are suitable for use in conjunction with various embodiments disclosed herein include, without limitation, those liquid crystal materials described above in connection with the alignment media disclosed herein. As previously discussed, it is possible to align the molecules of a liquid crystal material with an oriented surface. That is, a liquid crystal material can be applied to a surface that has been oriented and subsequently aligned such that the long axis of the liquid crystal molecules takes on an orientation that is generally parallel to the general direction of orientation of the surface. Thus, according to various embodiments disclosed herein wherein the alignment transfer material comprises a liquid crystal material, the liquid crystal material can be at least partially ordered by aligning the at least a portion of the liquid crystal material with at least a portion of the orientation facility such that the long axis of the molecules of at least a portion of the liquid crystal material are generally parallel to at least a first general direction of the orientation facility. In this manner, the general direction of the orientation facility can be transferred to the liquid crystal material, which in turn can transfer the general direction to another structure or material. Further, if the at least one orientation facility comprises a plurality of regions having general directions that together form a design or pattern (as previously described), that design or pattern can be transferred to the liquid crystal material by aligning the liquid crystal material with the various regions of the orientation facility as discussed above. Additionally, although not required, according to various embodiments disclosed herein, at least a portion of the liquid crystal material can be exposed to at least one of: a magnetic field, an electric field, linearly polarized infrared radiation, linearly polarized ultraviolet radiation, and linearly polarized visible radiation while being at least partially aligned with the orientation facility.

Still further, in addition to the at least partially aligned photochromic-dichroic compound connected to the substrate, the optical element according to various embodiments disclosed herein can comprise an at least partially ordered anisotropic material connected to the substrate. That is, according to certain embodiments the optical element comprises a substrate, an at least partially aligned photochromic-dichroic compound connected to the substrate, the photochromic-dichroic compound having an average absorption ratio greater than 2.3 in an activated state as determined according to the CELL METHOD, and an anisotropic material connected to the substrate.

As used herein the term "anisotropic" means having at least one property that differs in value when measured in at least one different direction. Thus, "anisotropic materials" are materials that have at least one property that differs in value when measured in at least one different direction. Examples of anisotropic materials that are suitable for use in conjunction with various embodiments disclosed herein include, without limitation, those liquid crystal materials described above.

According to various embodiments, the photochromic-dichroic compound can be aligned by interaction with the anisotropic material. For example, although not limiting herein, at least a portion of the photochromic-dichroic compound can be aligned such that the long-axis of the photochromic-dichroic compound in the dichroic state is essentially parallel to the general direction of the anisotropic material. Further, although not required, the photochromic-dichroic compound can be bound to or reacted with the anisotropic material.

Further, according to various embodiments disclosed herein, the photochromic-dichroic compound and the anisotropic material can be present as a coating on the substrate. For example, according to one embodiment, the anisotropic material can be a liquid crystal material, and the photochromic-dichroic compound and anisotropic material can be present as a liquid crystal coating on the substrate. According to another embodiment, the coating can be a phase-separated polymer coating comprising a matrix phase and a guest phase distributed in the matrix phase. Although not limiting herein, according to this embodiment, the matrix phase can comprise an at least partially ordered liquid crystal polymer. Further, according to this embodiment, the guest phase can comprise the anisotropic material and at least a portion of the photochromic-dichroic compound. Still further, as discussed above, the photochromic-dichroic compound can be at least partially aligned by interaction with the anisotropic material.

In another embodiment, the coating can comprise an interpenetrating polymer network. According to this embodiment, the anisotropic material and a polymeric material can form an interpenetrating polymer network, wherein at least a portion of the polymeric material interpenetrates with the anisotropic material. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. Further, according to this embodiment, at least a portion of the photochromic-dichroic compound can be aligned with the anisotropic material. Still further, according to this embodiment, the polymeric material can be isotropic or anisotropic, provided that, on the whole, the coating is anisotropic. Methods of forming such coatings are described in more detail herein below.

Still other embodiments disclosed herein provide an optical element comprising a substrate, an at least partially ordered orientation facility connected to the substrate, and a coating connected to the orientation facility, the coating comprising an anisotropic material that is at least partially aligned with the ordered orientation facility and a photochromic-dichroic compound that is at least partially aligned with the anisotropic material.

As previously discussed, the orientation facilities according to various embodiments disclosed herein can comprise a first ordered region having a first general direction and at least one second ordered region adjacent the first region having a second general direction that is different from the first general direction. Further, the orientation facility can comprise multiple ordered regions having multiple general directions that together create a specific design or pattern. Examples of orientation facilities that are suitable for use in conjunction with this embodiment are described above in detail. Additionally, according to various embodiments disclosed herein, a coating comprising an alignment transfer material can be positioned between the orientation facility and the coating comprising the anisotropic material and the photochromic-dichroic compound. Further, the general direction or pattern of the orientation facility can be transferred to the alignment transfer material by alignment, which, in turn, can transfer the general direction of the orientation facility to the coating comprising the anisotropic material and the photochromic-dichroic compound by alignment. That is, the anisotropic material of the coating can be aligned with the alignment transfer material. Further, the photochromic-dichroic compound can be at least partially aligned by interaction with the anisotropic material.

Further, according to various embodiments disclosed herein, the anisotropic material can be adapted to allow the photochromic-dichroic compound to switch from a first state to the second state at a desired rate. Generally speaking conventional photochromic compounds can undergo a transformation from one isomeric form to another in response to actinic radiation, with each isomeric form having a characteristic absorption spectrum. The photochromic-dichroic compounds according to various embodiments disclosed herein undergo a similar isomeric transformation. The rate or speed at which this isomeric transformation (and the reverse transformation) occurs depends, in part, upon the properties of the local environment surrounding the photochromic-dichroic compound (that is, the "host"). Although not limiting herein, it is believed by the inventors the rate of transformation of the photochromic-dichroic compound will depend, in part, upon the flexibility of the chain segments of the host, that is, the mobility or viscosity of the chain segments of the host. In particular, while not limiting herein, it is believed that the rate of transformation of the photochromic-dichroic compound will generally be faster in hosts having flexible chain segments than in host having stiff or rigid chain segments. Therefore, according to certain embodiments disclosed herein, wherein the anisotropic material is a host, the anisotropic material can be adapted to allow the photochromic-dichroic compound to transform between various isomeric states at desired rates. For example, although not limiting herein, the anisotropic material can be adapted by adjusting one or more of the molecular weight and the cross-link density of the anisotropic material.

According to another embodiment, the coating comprising an anisotropic material and a photochromic-dichroic compound can be a phase-separated polymer coating comprising matrix phase, for example and without limitation, a liquid crystal polymer, and guest phase distributed within the matrix phase. Further, according to this embodiment, the guest phase can comprise the anisotropic material. Still further, according to this embodiment, the majority of the photochromic-dichroic compound can be contained within the guest phase of the phase-separated polymer coating. As previously discussed, because the transformation rate of the photochromic-dichroic compound depends, in part, on the host in which it is contained, according to this embodiment, the rate of transformation of the photochromic-dichroic compound will depend, largely, on the properties of the guest phase.

For example, one embodiment provides an optical element comprising a substrate, at least one orientation facility connected to the substrate, and a coating connected to the orientation facility and comprising a phase-separated polymer. According to this embodiment, the phase-separated polymer can comprise a matrix phase, at least a portion of which is at least partially aligned with the orientation facility, and a guest phase comprising an anisotropic material dispersed within the matrix phase. Further according to this embodiment, at least a portion of the anisotropic material of the guest phase can be at least partially aligned with the orientation facility and a photochromic-dichroic compound can be at least partially aligned with the anisotropic material. Still further, according to various embodiments disclosed herein, the matrix phase of the phase-separated polymer can comprise a liquid crystal polymer, and the anisotropic material of the guest phase can be chosen from liquid crystal polymers and liquid crystal mesogens. Examples of such materials are set forth in detail above. Additionally, while not limiting herein, according to this embodiment, the coating comprising the phase-separated polymer can be substantially haze-free. Haze is defined as the percentage of transmitted light that deviates from the incident beam by more than 2.5 degrees on average according to ASTM D 1003 Standard Test Method of Haze and Luminous Transmittance of Transparent Plastics. An example of an instrument on which haze measurements according to ASTM D 1003 can be made is Haze-Gard Plus™ made by BYK-Gardener.

Further, although not limiting herein, according to other embodiments the photochromic-dichroic compound can be encapsulated or coated with an at least partially ordered host material and then the encapsulated or coated photochromic-dichroic compound can be dispersed within another material. For example, although not limiting herein, the photochromic-dichroic compound can be encapsulated or overcoated with an at least partially ordered anisotropic material having relatively flexible chain segments, such as a liquid crystal material, and thereafter dispersed or distributed in another material having relatively rigid chain segments. For example, the encapsulated photochromic-dichroic compound can be dispersed or distributed in a liquid crystal polymer having relatively rigid chain segments and thereafter the mixture can be applied to a substrate to form a coating.

According to still another embodiment, the coating comprising an anisotropic material and a photochromic-dichroic compound can be an interpenetrating polymer network coating. For example, the coating can comprise a polymeric material that interpenetrates with the anisotropic material, and the photochromic-dichroic compound can be at least partially aligned with the anisotropic material. Methods of forming such interpenetrating network coatings are described below in more detail.

Still other embodiments disclosed herein provide an optical element comprising a substrate, a first coating comprising an at least partially ordered alignment medium connected the substrate, a second coating comprising an alignment transfer material connected to and at least partially aligned with the alignment medium, and a third coating connected to the alignment transfer material, the third coating comprising an anisotropic material that is at least partially aligned with the alignment transfer material and a photochromic-dichroic compound that is at least partially aligned with the anisotropic material.

Although not limiting herein, according to various embodiments, the first coating comprising the at least partially ordered alignment medium can have a thickness that varies widely depending upon the final application and/or the processing equipment employed. For example, in one embodiment, the thickness of the coating can range from at least 0.5 nanometers to 10,000 nanometers. In another embodiment, the coating can have a thickness ranging from at least 0.5 nanometers to 1000 nanometers. In still another embodiment, the coating can have a thickness ranging from at least 2 nanometers to 500 nanometers. In yet another embodiment, the coating can have a thickness ranging from 100 nanometers to 500 nanometers. Additionally, according to various embodiments, the optical element can comprise a plurality of coatings comprising an at least partially ordered alignment medium. Further each of the coatings can have the same or a different thickness as the other coatings of the plurality.

Further, according to various embodiments disclosed herein, the second coating comprising the alignment transfer material can have a thickness that varies widely depending upon the final application and/or the processing equipment employed. For example, the thickness of the coating comprising the at least partially ordered alignment transfer material can range from 0.5 microns to 1000 microns. In another embodiment, the coating can have a thickness ranging from 1 to 25 microns. In still another embodiment, the coating can have a thickness ranging from 5 to 20 microns. Additionally, according to various embodiments, the optical element can comprise a plurality of coatings comprising an alignment transfer material. Further each of the plurality of coatings can have the same or a different thickness as the other coatings of the plurality.

Still further, according to various embodiments disclosed herein, the third at least partial coating comprising the anisotropic material and the photochromic-dichroic compound can have a thickness that varies widely depending upon the final application and/or the processing equipment employed. In one embodiment, the coating comprising the at least partially aligned anisotropic material and the \photochromic-dichroic compound can have a thickness of at least 0.5 microns to 1000 microns. According to other embodiments, the third coating can have a thickness ranging from 1 micron to 25 microns. According to still other embodiments, the third coating can have a thickness ranging from 5 microns to 20 microns. Additionally, according to various embodiments, the optical element can comprise a plurality of such coatings, and each of the coatings can have the same or a different thickness as the other coatings of the plurality. Examples of suitable photochromic-dichroic compounds are described above in detail.

Further, according to various embodiments, in addition to the third coating, either or both of the first and second coatings can comprise photochromic-dichroic compounds that are the same or different from the photochromic-dichroic compounds of the third coating. Still further, according to various embodiments, any of the coatings described above can further comprise at least one additive, at least one conventional dichroic compound and/or at least one conventional photochromic compound. Examples of suitable additives, conventional dichroic compounds, and conventional photochromic compounds are set forth above. Further, as previously discussed, in addition to the first, second, and third coatings described above, the optical elements according to various embodiments disclosed herein can further comprise primer coatings, anti-reflective coatings, photochromic coatings, linearly polarizing coatings, circularly polarizing coatings, elliptically polarizing coatings, transitional coatings, and protective coatings. Examples of such coatings are provided above.

Other embodiments disclosed herein provide a composite optical element comprising a substrate, an at least partially ordered polymeric sheet connected to the substrate, and an at least partially aligned photochromic-dichroic compound connected to the polymeric sheet and having an average absorption ratio greater than 2.3 in an activated state as determined according to the CELL METHOD. For example, although not limiting herein, according to one embodiment a stretched polymer sheet containing at least one photochromic-dichroic compound that is at least partially aligned by the oriented polymer chains of the stretched polymer sheet can be connected to the substrate.

Further, according to various embodiments, the composite optical element can comprise a plurality of polymeric sheets, at least one of which is at least partially ordered, connected to the substrate. For example, although not limiting herein, the composite optical element can comprise a substrate and an at least partially ordered polymeric sheet comprising an at least partially aligned photochromic-dichroic compound that interposed between two dimensionally stable or "rigid" polymer sheets connected to the substrate. According to other embodiments, the composite optical element can comprise two or more at least partially ordered polymeric sheets comprising an at least partially aligned photochromic-dichroic compound that are connected to the substrate. Further, the two or more at least partially ordered polymeric sheets can have the same general direction or different general directions and can comprise the same photochromic-dichroic compound or different photochromic-dichroic compounds. Still further, the polymeric sheets can be stacked or layered on the substrate or they can be positioned adjacent each other on the substrate.

Examples of polymeric sheets that can be used in conjunction with this embodiment include, without limitation, stretched polymer sheets, ordered liquid crystal polymer sheets, and photo-oriented polymer sheets. Examples of polymeric materials, other than liquid crystal materials and photo-orientation materials that can be used in forming polymeric sheets according to various embodiments disclosed herein include without limitation: polyvinyl alcohol, polyvinyl chloride, polyurethane, polyacrylate, and polycaprolactam. Examples of methods of ordering polymeric sheets are described below in more detail.

Still other embodiments disclosed herein provide a composite optical element comprising a substrate and at least one sheet connected to the substrate, the sheet comprising: an at least partially ordered liquid crystal polymer having at least a first general direction, an at least partially ordered liquid crystal material having a second general direction distributed within the liquid crystal polymer, and a photochromic-dichroic compound that is at least partially aligned with the liquid crystal material, wherein the second general direction is generally parallel to the first general direction.

The optical elements of the present invention further comprise a birefringent layer (b) connected to the photochromic linear polarizing element. The birefringent layer is operable to circularly or elliptically polarize transmitted radiation. When a circular polarizing element is desired, the birefringent layer comprises a quarter-wave plate. The birefringent layer, also called a compensation plate or layer or a retardation plate or layer, may be composed of one sheet or may be a multiple layer structure of two or more.

In certain embodiments of the present invention, the birefringent layer (b) comprises a layer having a first ordered region having a first general direction, and at least one second ordered region adjacent the first ordered region having a second general direction that is the same or different from the first general direction so as to form a desired pattern in the layer.

The material used to prepare the birefringent layer is not particularly limited, and may be any birefringent material known in the art. For example, a polymer film, a liquid crystal film, self-assembling materials, or a film in which a liquid crystal material is aligned can be used. Examples of particular birefringent layers include those described in U.S. Pat. No. 6,864,932 at column 3, line 60 to column 4, line 64; U.S. Pat. No. 5,550,661 at column 4, line 30 to column 7, line 2; U.S. Pat. No. 5,948,487 at column 7, line 1 to column 10, line 10, each of which is incorporated herein by reference.

Examples of specific birefringent films include film Model No. NRF-140, a positively birefringent, uniaxial film available from Nitto Corporation, Japan, or Nitto Denko America, Inc., New Brunswick, N.J. Also suitable are OPTIGRAFIX circular polarizer films, available from GRAFIX Plastics, a division of GRAFIX, Inc., Cleveland, Ohio.

Specific polymeric sheets used to prepare the birefringent layer (b) may comprise polyacrylates, polymethacrylates, poly($C_1$-$C_{12}$) alkyl methacrylates, polyoxy(alkylene methacrylates), poly (alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth)acrylamide), poly(dimethyl acrylamide), poly(hydroxyethyl methacrylate), poly ((meth)acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate)monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers; and in particular self-assembling materials, polycarbonate, polyamide, polyimide, poly(meth)acrylate, polycyclic alkene, polyurethane, poly (urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly (vinylacetate), poly(vinyl alcohol), poly(vinyl chloride), poly (vinylformal), poly(vinylacetal), poly(vinylidene chloride), poly(ethylene terephthalate), polyester, polysulfone, polyolefin, copolymers thereof, and/or mixtures thereof.

The birefringent layer (b) may be applied to the photochromic linearly polarizing element in such a way that a slow axis direction (direction where a refractive index is largest in a plane) of the birefringent layer is oriented with respect to an alignment direction of the polarizer to yield the desired resultant polarization; i.e., circular or elliptical. For example, a quarter-wave plate would be oriented at an angle of 45°+/−5° with respect to an alignment direction of the photochromic dye of the polarizer, and often 45°+/−3°.

Alternatively, the resultant polarization of the optical element may be determined by setting the thickness of the birefringent layer. For example, to yield a circular polarizing element, the thickness of the birefringent layer is such that the emerging refracted rays of light are out of phase by one-quarter wavelength.

Embodiments of methods of making optical elements and devices will now be described. One embodiment provides a method of making an optical element comprising forming a coating comprising an at least partially aligned photochromic-dichroic compound on a substrate. As used herein the term "on" means in direct contact with an object (such as a substrate) or in indirect contact with the object through one or more other coatings or structures, at least one of which is in direct contact with the object. Further, according to this embodiment, in addition to the photochromic-dichroic compound, an at least partially ordered anisotropic material can be connected to the substrate.

According to this embodiment, the coating can have an average absorption ratio of at least 1.5. Further, according to this and other embodiments of methods of making elements and devices disclosed herein, the photochromic-dichroic compound can have an average absorption ratio greater than 2.3 in an activated state as determined according to the CELL METHOD. Examples of photochromic-dichroic compounds that are useful in conjunction with the methods of making elements and devices disclosed herein are set forth above in detail.

According to various embodiments disclosed herein, forming the coating comprising the photochromic-dichroic compound can comprise applying the photochromic-dichroic compound and an anisotropic material to the substrate, at least partially ordering the anisotropic material, and at least partially aligning the photochromic-dichroic compound with the anisotropic material. Methods of applying the photochromic-dichroic compound and the anisotropic material to the substrate that can be used in conjunction with the methods according to various embodiments disclosed herein include, but are not limited to, spin coating, spray coating, spray and spin coating, curtain coating, flow coating, dip coating, injection molding, casting, roll coating, wire coating, and overmolding.

According to other embodiments, applying the photochromic-dichroic compound and the anisotropic material to the substrate can comprise forming a coating of the anisotropic material on a mold, which may be treated with a release material. Thereafter, the anisotropic material can be at least partially ordered (as discussed in more detail below) and at least partially set. Thereafter, the substrate can be formed over the coating (i.e., overmolding), for example, by casting the substrate forming material in the mold. The substrate forming material can then be at least partially set to form the substrate. Subsequently, the substrate and the coating of the anisotropic material can be released from the mold. Further, according to this embodiment, the photochromic-dichroic compound can be applied to the mold with the anisotropic material, or it can be imbibed into the anisotropic material after the anisotropic material has been applied to the mold, after the anisotropic material has been at least partially ordered, or after the substrate with the coating of the ordered anisotropic material has been released from the mold.

According to other embodiments disclosed herein, forming the coating comprising the photochromic-dichroic compound can comprise applying an anisotropic material to the substrate, imbibing a photochromic-dichroic compound into the anisotropic material, at least partially ordering the anisotropic material, and at least partially aligning the photochromic-dichroic compound with the anisotropic material. Methods of imbibing photochromic-dichroic compounds into various coatings are described herein below in more detail.

Methods of ordering the anisotropic material include exposing the anisotropic material to at least one of a magnetic field, an electric field, linearly polarized ultraviolet radiation, linearly polarized infrared radiation, linearly polarized visible radiation, and a shear force. Further, the anisotropic material can be at least partially ordered by aligning the anisotropic material with another material or structure. For example, although not limiting herein, the anisotropic material can be at least partially ordered by aligning the anisotropic material with an orientation facility—such as, but not limited to, those orientation facilities previously discussed.

As previously described, by ordering at least a portion of the anisotropic material, it is possible to at least partially the photochromic-dichroic compound that contained within or otherwise connected to the anisotropic material. Although not required, the photochromic-dichroic compound can be at least partially aligned while in an activated state. Further, according to various embodiments disclosed herein, applying the photochromic-dichroic compound and the anisotropic material to the substrate can occur at essentially the same time as, prior to, or after ordering the anisotropic material and/or aligning the photochromic-dichroic compound.

For example, according to one embodiment, applying the photochromic-dichroic compound and the anisotropic material can occur at essentially the same time as ordering the anisotropic material and aligning the photochromic-dichroic compound. More particularly, according to this limiting embodiment, the photochromic-dichroic compound and anisotropic material can be applied to the substrate using a coating technique that can introduce a shear force to the anisotropic material during application such that the anisotropic material can be at least partially ordered generally parallel to the direction of the applied shear force. For example, although not limiting herein, a solution or mixture (optionally in a solvent or carrier) of the photochromic-dichroic compound and the anisotropic material can be curtain coated on to the substrate such that shear forces are introduced to the materials being applied due to relative movement of the surface of the substrate with respect to the materials being applied. The shear forces can cause the anisotropic material to be ordered in a general direction that is essentially parallel to the direction of the movement of the surface. As discussed above, by ordering at least a portion of the anisotropic material in this manner, the photochromic-dichroic compound which is contained within or connected to the anisotropic material can be aligned by the anisotropic material. Further, although not required, by exposing the photochromic-dichroic compound to actinic radiation during the curtain coating process, such that the photochromic-dichroic compound is in an activated state, at least partial alignment of the photochromic-dichroic compound while in the activated state can be achieved.

In another embodiment wherein the photochromic-dichroic compound and the anisotropic material are applied to the substrate prior to ordering the anisotropic material and aligning the photochromic-dichroic compound, applying the materials can comprise spin coating a solution or mixture of the photochromic-dichroic compound and anisotropic material (optionally in a solvent or carrier) onto the substrate. Thereafter, according to this embodiment, the anisotropic material can be at least partially ordered, for example, by exposing the anisotropic material to a magnetic field, an electric field, linearly polarized ultraviolet radiation, linearly polarized infrared radiation, linearly polarized visible radiation, or a shear force. Further the anisotropic material can be at least partially ordered by aligning the anisotropic material with another material or structure, for example, an orientation facility.

In still another embodiment, wherein the photochromic-dichroic compound is at least partially aligned and the anisotropic material is at least partially ordered prior to being applied to the substrate, a solution or mixture (optionally in a solvent or carrier) of the photochromic-dichroic compound and the anisotropic material can be applied to an ordered polymeric sheet to form a coating. Thereafter, the anisotropic material can be allowed to align with the polymeric sheet. The polymeric sheet can be subsequently applied to the substrate by, for example, but not limited to, laminating or bonding. Alternatively, the coating can be transferred from the polymeric sheet to the substrate by methods known in the art, such as, but not limited to hot stamping. Other methods of applying polymeric sheets are described herein in more detail.

In another embodiment, applying the photochromic-dichroic compound and anisotropic material to the substrate can comprise applying a phase-separating polymer system comprising a matrix phase-forming material comprising a liquid crystal material and a guest phase-forming material comprising the anisotropic material and photochromic-dichroic compound. After applying the phase-separating polymer system, according to this embodiment, the liquid crystal material of the matrix phase and the anisotropic material of the guest phase are at least partially ordered, such that the photochromic-dichroic compound is aligned with the anisotropic material of the guest phase. Methods of at least partially ordering the matrix phase-forming material and the guest phase-forming material of the phase-separating polymer system include exposing the coating comprising the phase-separating polymer system to at least one of: a magnetic field, an electric field, linearly polarized infrared radiation, linearly polarized ultraviolet radiation, linearly polarized visible radiation, and a shear force. Further, at least partially ordering the matrix phase-forming material and the guest phase-forming material can comprise at least partially aligning at the portions with an orientation facility, as described in more detail below.

After at least partially ordering the matrix phase-forming material and the guest phase-forming material, the guest phase-forming material can be separated from the matrix phase-forming material by polymerization induced phase separation and/or solvent induced phase separation. Although for clarity the separation of the matrix and guest phase-forming materials is described herein in relation to the guest phase-forming material separating from the matrix phase-forming material, it should be appreciated that this language is intended to cover any separation between the two phase-forming materials. That is, this language is intended to cover separation of the guest phase-forming material from the matrix phase-forming material and separation of the matrix phase-forming material from the guest phase-forming material, as well as, simultaneous separation of both phase-forming materials and any combination thereof.

According to various embodiments disclosed herein, the matrix phase-forming material can comprise a liquid crystal material chosen from liquid crystal monomers, liquid crystal pre-polymers, and liquid crystal polymers. Further, according to various embodiments, the guest phase-forming material can comprise a liquid crystal material chosen from liquid crystal mesogens, liquid crystal monomers, and liquid crystal polymers and pre-polymers. Examples of such materials are set forth in detail above.

In one specific embodiment, the phase-separating polymer system can comprise a mixture of a matrix phase-forming material comprising a liquid crystal monomer, a guest phase-forming material comprising liquid crystal mesogens, and at least one photochromic-dichroic compound. According to this embodiment, causing at least a portion of the guest phase-forming material to separate from at least a portion of the matrix phase-forming material can comprise polymerization induced phase-separation. That is, at least a portion of the liquid crystal monomer of the matrix phase can be polymerized and thereby separated from the liquid crystal mesogens of the guest phase-forming material. Methods of polymerization that can be used in conjunction with various embodiments disclosed herein include photo-induced polymerization and thermally-induced polymerization.

In another specific embodiment, the phase-separating polymer system can comprise a mixture of a matrix phase-forming material comprising a liquid crystal monomer, a guest phase-forming material comprising a low viscosity liquid crystal monomer having a different functionality from the liquid crystal monomer of the matrix phase, and at least one photochromic-dichroic compound. As used herein, the term "low viscosity liquid crystal monomer," refers to a liquid crystal monomer mixture or solution that is freely flowing at room temperature. According to this embodiment, causing at least a portion of the guest phase-forming material to separate from at least a portion of the matrix phase-forming material can comprise polymerization induced phase-separation. That is, at least a portion of the liquid crystal monomer of the matrix phase can be polymerized under conditions that do not cause the liquid crystal monomer of the guest phase to polymerize. During polymerization of the matrix phase-forming material, the guest phase-forming material will separate from the matrix phase-forming material. Thereafter, the liquid crystal monomer of the guest phase-forming material can be polymerized in a separate polymerization process.

In another specific embodiment, the phase-separating polymer system can comprise a solution in at least one common solvent of a matrix phase-forming material comprising a liquid crystal polymer, a guest phase-forming material comprising a liquid crystal polymer that is different from the liquid crystal polymer of the matrix phase-forming material, and a photochromic-dichroic compound. According to this embodiment, causing at least a portion of the guest phase-forming material to separate from the matrix phase-forming material can comprise solvent induced phase-separation. That is, the common solvent can be evaporated from the mixture of liquid crystal polymers, thereby causing the two phases to separate from each other.

Alternatively, according to various embodiments disclosed herein, forming the coating comprising the photochromic-dichroic compound can comprise applying an anisotropic material to the substrate, imbibing the photochromic-dichroic compound into the anisotropic material, at least partially ordering the anisotropic material, and at least partially aligning the photochromic-dichroic compound with the anisotropic material. Further, although not limiting herein, at least partially ordering the anisotropic material can occur before imbibing the photochromic-dichroic compound thereinto. Still further, although not required, the photochromic-dichroic compound can be at least partially aligned while in an activated state. Methods of applying and aligning anisotropic materials are described herein below.

For example, according to one embodiment, the photochromic-dichroic compound can be imbibed into the anisotropic material, for example, by applying a solution or mixture of the photochromic-dichroic compound in a carrier to a portion of the anisotropic material and allowing the photochromic-dichroic compound to diffuse into the anisotropic material, either with or without heating. Further, according to this embodiment, the anisotropic material can be part of a phase-separated polymer coating as described above.

Other embodiments disclosed herein provide a method of making an optical element comprising imparting at least one orientation facility to a substrate, and subsequently forming a coating comprising an at least partially aligned photochromic-dichroic compound on the orientation facility. According to this and other embodiments disclosed herein, imparting the orientation facility to the substrate can comprise at least one of: forming a coating comprising an at least partially ordered alignment medium on the substrate, applying an at least partially ordered polymer sheet to the substrate, treating the substrate, and forming a Langmuir-Blodgett film on the substrate.

According to one embodiment, imparting the orientation facility on the substrate can comprise forming a coating comprising an at least partially ordered alignment medium on the substrate. Further, according to this embodiment, forming the coating can comprise applying an alignment medium to the substrate and at least partially ordering the alignment medium. Methods of ordering the alignment medium that can be used in conjunction with this and other embodiments disclosed herein include, but are not limited to, exposing the alignment medium to at least one of linearly polarized ultraviolet radiation, linearly polarized infrared radiation, linearly polarized visible radiation, a magnetic field, an electric field, and a shear force. Further, ordering the alignment medium can comprise treating the coating comprising the alignment medium by, for example and without limitation, etching or rubbing the at least a portion of the alignment medium.

For example, although not limiting herein, according to one embodiment wherein the orientation facility comprises a coating comprising an alignment medium that is a photo-orientation material (such as, but not limited to a photo-orientable polymer network), imparting the orientation facility can comprise forming a coating comprising a photo-orientation material on the substrate, and at least partially ordering the photo-orientation material by exposing the material to linearly polarized ultraviolet radiation. Thereafter, the photochromic-dichroic compound can be applied to the photo-orientation material and at least partially aligned.

Although not required, according to various embodiments wherein imparting the orientation facility comprises forming a coating of an at least partially ordered alignment medium, the alignment medium can be at least partially set. Further, setting the alignment medium can occur at essentially the same time as aligning the alignment medium or it can occur after aligning the alignment medium. Still further, according to various embodiments disclosed herein, setting the alignment medium can comprise at least partially curing the medium by exposing it to infrared, ultraviolet, gamma, microwave or electron radiation so as to initiate the polymerization reaction of the polymerizable components or cross-linking with or without a catalyst or initiator. If desired or required, this can be followed by a heating step.

As discussed above, according to various embodiments disclosed herein, subsequent to imparting the orientation facility on the substrate, a coating comprising an at least partially aligned photochromic-dichroic compound is formed on the orientation facility. Methods of forming such coatings include those methods of forming coatings comprising a photochromic-dichroic compound that is at least partially aligned on a substrate that are set forth above in detail.

For example, although not limiting herein, forming the coating comprising the photochromic-dichroic compound can include, spin coating, spray coating, spray and spin coating, curtain coating, flow coating, dip coating, injection molding, casting, roll coating, wire coating, and overmolding a composition comprising the photochromic-dichroic compound on to the orientation facility, and thereafter, aligning the photochromic-dichroic compound with the orientation facility and/or with another material or structure (such as an alignment transfer material if present), with or without exposure to a magnetic field, an electric field, linearly polarized infrared radiation, linearly polarized ultraviolet radiation, linearly polarized visible radiation or a shear force.

According to one embodiment, forming the coating comprising the photochromic-dichroic compound that is at least partially aligned on the orientation facility can comprise applying a polymerizable composition, an anisotropic material, and a photochromic-dichroic compound on the orientation facility. Thereafter, the anisotropic material can be at least partially aligned with the orientation facility and the photochromic-dichroic compound with the anisotropic material. After aligning the anisotropic material and the photochromic-dichroic compound, the coating can be subjected to a dual curing process, wherein the anisotropic material and the polymerizable composition are at least partially set using at least two curing methods. Examples of suitable curing methods include exposing the coating to ultraviolet radiation, visible radiation, gamma radiation, microwave radiation, electron radiation, or thermal energy.

For example, although not limiting herein, in one embodiment the anisotropic material can be exposed to ultraviolet or visible radiation to cause the anisotropic material to at least partially set. Thereafter, the polymerizable composition can be at least partially set by exposure to thermal energy. Further, although not required the photochromic-dichroic compound can be at least partially aligned with the anisotropic material while in an activated state by exposing the coating to ultraviolet radiation sufficient to cause the photochromic-dichroic compound to switch from a first state to a second state, but insufficient to cause the anisotropic material to set, while the anisotropic material is at least partially aligned with the orientation facility (as discussed above).

In one specific embodiment, the polymerizable composition can be dihydroxy and isocyanate monomers and the anisotropic material can comprise a liquid crystal monomer. According to this embodiment, after applying the polymerizable composition, the anisotropic material and the photochromic-dichroic compound on the orientation facility, the anisotropic material can be at least partially aligned with the orientation facility and the photochromic-dichroic compound can be at least partially aligned with the anisotropic material. Further, after alignment, the coating can be exposed to ultraviolet or visible radiation sufficient to cause the anisotropic material to least partially set. Further, before, during or after setting the anisotropic material, the polymerizable composition can be at least partially set by exposing the coating to thermal energy.

In another embodiment, the dual cure process can comprise first exposing the polymerizable composition to thermal energy sufficient to cause the polymerizable composition to at least partially set. Thereafter, the anisotropic material can be exposed to ultraviolet or visible radiation to cause the anisotropic material to at least partially set. Further, the anisotropic material can be at least partially aligned before, during or after exposing the coating to thermal energy and prior to setting the anisotropic material.

In still another embodiment, the dual cure process can comprise setting the polymerizable composition at essentially the same time as setting the anisotropic material, for example, by simultaneously exposing the coating to ultraviolet or visible radiation and thermal energy.

Further, as previously discussed in relation to coatings comprising interpenetrating polymer networks, according to various embodiments disclosed herein, the polymerizable composition can be an isotropic material or an anisotropic material, provided that the coating comprising the photochromic-dichroic compound is, on the whole, anisotropic.

Additionally, the methods of making optical elements and devices according to various embodiments disclosed herein can further comprise forming a primer coating on the substrate prior to imparting the orientation facility to the substrate or prior to forming a coating comprising the photochromic-dichroic compound thereon. Moreover, at least one additional coating chosen from photochromic coatings, antireflective coatings, linearly polarizing coatings, circularly polarizing coatings, elliptically polarizing coatings, transitional coatings, primer coatings and protective coatings can be formed on the substrate and/or over the coating comprising the photochromic-dichroic compound. Examples of suitable primer coatings, photochromic coatings, anti-reflective coatings, linearly polarizing coatings, transitional coatings, primer coatings and protective coatings are all described above.

Other embodiments disclosed herein provide methods of making an optical element comprising forming a coating on a substrate and adapting the coating to switch from a first state to a second linearly polarizing state in response to actinic radiation and to revert back to the first state in response to thermal energy. According to one embodiment forming the coating on the substrate and adapting the coating to switch from a first state to a second linearly polarizing state in response to actinic radiation and to revert back to the first state in response to thermal energy can occur at essentially the same time. According to another embodiment, forming the coating on the substrate occurs prior to adapting the coating to switch from a first state to a second linearly polarizing state in response to actinic radiation and to revert back to the first state in response to thermal energy. According to still another embodiment, forming the coating on the substrate occurs after adapting the coating to switch from a first state to a second linearly polarizing state in response to actinic radiation and to revert back to the first state in response to thermal energy.

In one embodiment, forming the coating on the substrate can comprise applying an anisotropic material and a photochromic-dichroic compound to the substrate, and adapting the coating to switch from a first state to a second linearly polarizing state in response to actinic radiation and to revert back to the first state in response to thermal energy can comprise at least partially aligning the photochromic-dichroic compound. Further, according to this embodiment at least partially aligning the photochromic-dichroic compound can comprise at least partially ordering the anisotropic material and at least partially aligning the photochromic-dichroic compound with the anisotropic material. Still further, although not required, the photochromic-dichroic compound can be aligned while in an activated state, for example, by exposing the photochromic-dichroic compound to actinic radiation sufficient to cause the photochromic-dichroic compound to switch from a first state to a second state while aligning the photochromic-dichroic compound.

In another embodiment, forming the coating on the substrate can comprise applying an alignment medium to the substrate, and adapting the coating to switch from a first state to a second linearly polarizing state in response to actinic radiation and to revert back to the first state in response to thermal energy can comprise at least partially ordering the alignment medium, applying a photochromic-dichroic compound to the coating comprising the alignment medium, and at least partially aligning the photochromic-dichroic compound.

In one embodiment, applying the photochromic-dichroic compound to the coating comprising the alignment medium can comprise forming a coating comprising the photochromic-dichroic compound and an anisotropic material on the coating comprising the alignment medium. Moreover, at least partially aligning the photochromic-dichroic compound can comprise aligning the anisotropic material with the alignment medium. Further, although not required, the coating comprising the alignment medium can be at least partially set prior to applying the photochromic-dichroic compound.

Additionally or alternatively, the photochromic-dichroic compound can be applied to the coating comprising the at least partially ordered alignment medium by imbibition. Suitable imbibition techniques are described, for example, U.S. Pat. Nos. 5,130,353 and 5,185,390, the specifications of which are specifically incorporated by reference herein. For example, although not limiting herein, the photochromic-dichroic compound can be applied to the coating comprising the at least partially ordered alignment medium by applying the photochromic-dichroic compound, either as the neat photochromic-dichroic compound or dissolved in a polymeric or other organic solvent carrier, and allowing the photochromic-dichroic compound to diffuse into the coating comprising the at least partially ordered alignment medium, either with or without heating. Further, if desired, the photochromic-dichroic compound can be exposed to actinic radiation sufficient to cause the photochromic compound to switch from a first state to a second state during diffusion.

Other embodiments disclosed herein provide a method of making an optical element comprising forming a coating comprising an alignment medium on a substrate and at least partially ordering the alignment medium, forming a coating comprising an alignment transfer material on the coating comprising the alignment medium and at least partially aligning the alignment transfer material with the alignment medium, and forming a coating comprising an anisotropic material and a photochromic-dichroic compound on the alignment transfer material, at least partially aligning the anisotropic material with the alignment transfer material, and at least partially aligning the photochromic-dichroic compound with the anisotropic material.

Further, according to various embodiments disclosed herein, forming the coating comprising the alignment transfer material can comprise forming a first coating comprising an alignment transfer material, the first coating having a thickness ranging from 2 to 8 microns, at least partially aligning the alignment transfer material of the first coating with the alignment medium, and setting the alignment transfer material of the first coating. Thereafter, a second coating having a thickness ranging from greater than 5 to 20 microns and comprising an alignment transfer material can be applied to the first coating and the alignment transfer material of the second coating can be at least partially aligned with the alignment transfer material of the first coating.

Still other embodiments disclosed herein provide a method of making a composite optical element comprising connecting at least one at least partially ordered polymeric sheet to at least a portion of a substrate, the at least partially ordered polymeric sheet comprising at least one at least partially aligned photochromic-dichroic compound connected to at least a portion thereof and having an average absorption ratio greater than 2.3 in an activated state as determined according to the CELL METHOD. Although not limiting herein, according to this embodiment, the at least one at least partially ordered polymeric sheet can comprise, for example, a stretched polymer sheet, a photo-oriented polymer sheet, an at least partially ordered phase-separated polymer sheet, or a combination thereof.

Other embodiments disclosed herein provide a method of making a composite optical element comprising connecting a sheet comprising an at least partially ordered liquid crystal polymer having a first general direction, an at least partially ordered liquid crystal material distributed within the liquid crystal polymer, and a photochromic-dichroic compound that is at least partially aligned with the liquid crystal material to the substrate. Further, according to this embodiment, the liquid crystal material distributed within the liquid crystal polymer can have a second general direction that is generally parallel to the liquid crystal polymer.

For example, although not limiting herein, according to one embodiment, forming the sheet can comprise applying a phase-separating polymer system comprising a matrix phase-forming material comprising a liquid crystal material, a guest phase-forming material comprising a liquid crystal material, and at least one photochromic-dichroic compound on to a substrate. Thereafter, the matrix phase-forming material and the guest phase-forming material can be at least partially ordered, and the photochromic-dichroic compound can be at least partially aligned with the guest phase-forming material. After alignment, the guest phase-forming material can be separated from the matrix phase-forming material by polymerization induced phase-separation and/or solvent induced phase-separation, and the phase-separated polymer coating can be removed from the substrate to form the sheet.

Alternatively, the phase-separating polymer system can be applied on the substrate, ordered and aligned as discussed above, and thereafter removed from the substrate to form a phase-separated polymer sheet. Subsequently, a photochromic-dichroic compound can be imbibed into the sheet. Alternatively or additionally, a photochromic-dichroic compound can be imbibed into the coating prior to removing the coating from the substrate to form the sheet.

According to still another embodiment forming the sheet can comprise: forming an at least partially ordered liquid crystal polymer sheet and imbibing liquid crystal mesogens and a photochromic-dichroic compound into the liquid crystal polymer sheet. For example, according to this embodiment, a sheet comprising a liquid crystal polymer can be formed and at least partially ordered by a method of forming a polymer sheet that can at least partially order the liquid crystal polymer during formation, for example by extrusion. Alternatively, a liquid crystal polymer can be cast onto a substrate and at least partially ordered by one of the methods of ordering liquid crystal materials set forth above. For example, although not limiting herein, the liquid crystal material can be exposed to a magnetic or an electric field. After being at least partially ordered, the liquid crystal polymer can be at least partially set and removed from the substrate to form a sheet comprising an at least partially ordered liquid crystal polymer matrix. Still further, a liquid crystal polymer sheet can be cast, at least partially set, and subsequently stretched to form sheet comprising an at least partially ordered liquid crystal polymer.

After forming the sheet comprising the at least partially ordered liquid crystal polymer, a liquid crystal mesogen and a photochromic-dichroic compound can be imbibed into the liquid crystal polymer matrix. For example, although not limiting herein, the liquid crystal mesogen and the photochromic-dichroic compound can be imbibed into the liquid crystal polymer by applying a solution or mixture of the liquid crystal mesogen and the photochromic-dichroic compound in a carrier to the liquid crystal polymer and, thereafter, allowing the liquid crystal mesogen and the photochromic-dichroic compound to diffuse into the liquid crystal polymer sheet, either with or without heating. Alternatively, the sheet comprising the liquid crystal polymer can be immersed into a solution or mixture of the liquid crystal mesogen and the photochromic-dichroic compound in a carrier and the liquid crystal mesogen and the photochromic-dichroic compound can be imbibed into the liquid crystal polymer sheet by diffusion, either with or without heating.

According to still another embodiment, forming the sheet can comprise forming a liquid crystal polymer sheet, imbibing the liquid crystal polymer sheet with a liquid crystal mesogen and a photochromic-dichroic compound (for example as discussed above), and thereafter at least partially ordering the liquid crystal polymer, the liquid crystal mesogen, and the photochromic-dichroic compound distributed therein. Although not limiting herein, for example, the liquid crystal polymer sheet, the liquid crystal mesogen, and the photochromic-dichroic compound distributed therein can be at least partially ordered by stretching the liquid crystal polymer sheet. Further according to this embodiment, the liquid crystal polymer sheet can be formed using conventional polymer processing techniques, such as, but not limited to, extrusion and casting.

In still another embodiment, a photo-oriented polymer sheet comprising a coating of an anisotropic material and a photochromic-dichroic compound is applied to the substrate.

For example, according to this embodiment, photo-oriented polymer sheet can be formed by applying a layer of a photo-orientable polymer network on a release layer and subsequently ordering and at least partially curing the photo-orientable polymer network; forming a coating of an anisotropic material and a photochromic-dichroic compound on the layer comprising the photo-orientable polymer network, at least partially aligning the anisotropic material and the photochromic-dichroic compound with the photo-orientable polymer network, and curing the anisotropic material. The release layer can then be removed and the layer of the photo-orientable polymer network comprising the coating of the anisotropic material and the photochromic-dichroic compound from the release layer to form the ordered polymeric sheet.

Further, according to various embodiments disclosed herein, connecting the polymeric sheet comprising the photochromic-dichroic compound to the substrate can comprise, for example, at least one of: laminating, fusing, in-mold casting, and adhesively bonding the polymeric sheet to the substrate. As used herein, the in-mold casting includes a variety of casting techniques, such as but not limited to: overmolding, wherein the sheet is placed in a mold and the substrate is formed (for example by casting) over at least a portion of the sheet; and injection molding, wherein the substrate is formed around the sheet. According to one embodiment, the polymeric sheet can be laminated on a surface of a first portion of the substrate, and the first portion of the substrate can be placed in a mold. Thereafter, a second portion of the substrate can be formed (for example by casting) on top of the first portion of the substrate such that the polymeric layer is between the two portions of the substrate.

Figure 2:
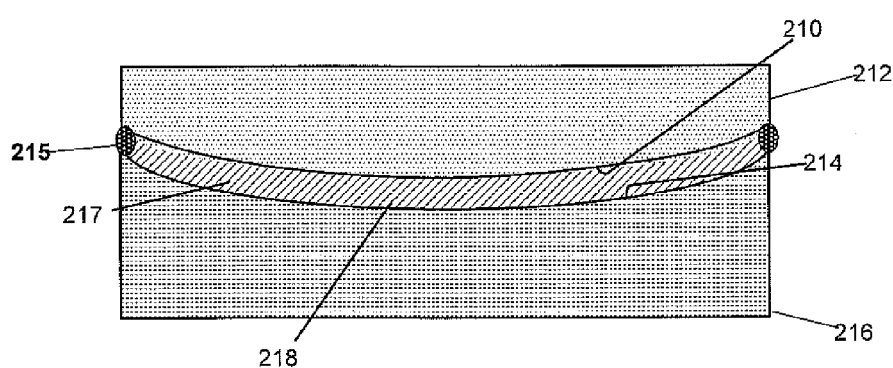
FIG. 2 is a schematic, cross-sectional view of an overmolding assembly according to one non-limiting embodiment disclosed herein.

Another specific embodiment provides a method of making an optical element comprising overmolding a coating comprising an at least partially ordered liquid crystal material and an at least partially aligned photochromic-dichroic compound on an optical substrate, and more particularly, on an ophthalmic substrate. Referring now to FIG. 2, according to this embodiment, the method comprises placing a surface 210 of an optical substrate 212 adjacent a to a surface 214 of a transparent mold 216 to define a molding region 217. The surface 214 of transparent mold 216 can be concave or spherically negative (as shown), or it can have other configurations as required. Further, although not required, a gasket or spacer 215 can be placed between optical substrate 212 and transparent mold 216. After positioning the optical substrate 212, a liquid crystal material 218 containing at least one photochromic-dichroic compound (not shown) can be introduced into the molding region 217 defined by the surface 210 of the optical substrate 212 and the surface 214 of the transparent mold 216, such that at least a portion of the liquid crystal material 218 is caused to flow therebetween. Thereafter, the liquid crystal material 218 can be at least partially ordered, for example, by exposure to an electric field, a magnetic field, linearly polarized infrared radiation, linearly polarized ultraviolet radiation, and/or linearly polarized visible radiation, and the photochromic-dichroic compound can be at least partially aligned with the liquid crystal material. Thereafter, the liquid crystal material can be polymerized. After polymerization, the optical substrate having the coating comprising an at least partially ordered liquid crystal material and the photochromic-dichroic compound on a surface thereof can be released from the mold.

Alternatively, the liquid crystal material 218 containing the photochromic-dichroic compound can be introduced onto surface 214 of transparent mold 216 prior to placing at least a portion of surface 210 of the optical substrate 212 adjacent thereto such that at least a portion of surface 210 contacts at least a portion of the liquid crystal material 218, thereby causing the liquid crystal material 218 to flow between surface 210 and surface 214. Thereafter, the liquid crystal material 218 can be at least partially ordered, and the photochromic-dichroic compound can be at least partially aligned as discussed above. After polymerization of the liquid crystal material, the optical substrate having the coating comprising an at least partially ordered liquid crystal material and the photochromic-dichroic compound on a surface thereof can be released from the mold.

According to still other embodiments, a coating comprising at least partially ordered liquid crystal material, without the photochromic-dichroic compound, can be formed on the surface of an optical substrate as discussed above. After releasing the substrate and the coating from the mold, a photochromic-dichroic compound can be imbibed into the liquid crystal material.

Although not shown in FIG. 2, additionally or alternatively, an orientation facility having a first general direction can be imparted onto the surface of the transparent mold prior to introducing the liquid crystal material into the mold and/or onto the surface of the optical substrate prior contacting the surface of the optical substrate with the liquid crystal material. Further, according to this embodiment, ordering the liquid crystal material can comprise at least partially aligning the liquid crystal material with the orientation facility on the surface of the mold and/or on the surface of the optical substrate.

After preparation of the photochromic linear polarizing element using any of the methods disclosed above, the birefringent layer (b) is connected thereto. The birefringent layer can be applied to the photochromic linear polarizing element by, for example, laminating or adhesive bonding. Alternatively, the birefringent layer (b) can be connected to the photochromic linear polarizing element by methods known in the art, such as hot stamping. Suitable adhesives for connecting the birefringent layer to the photochromic linear polarizing element include those disclosed in U.S. Pat. No. 6,864,932 at column 4, line 65 through column 60, incorporated herein by reference.

Although not limiting herein, it is contemplated that the aforementioned over molding methods of making coatings can be particularly useful in forming coatings on multi-focal ophthalmic lenses, or for forming coatings for other applications where relatively thick alignment facilities are desired.

As previously discussed, various embodiments disclosed herein relate to display elements and devices. Further, as previously discussed, as used herein the term "display" means the visible representation of information in words, numbers, symbols, designs or drawings. Examples of display elements and devices include screens, monitors, and security elements. Examples of security elements include security marks and authentication marks that are connected to a substrate, such as and without limitation: access cards and passes, e.g., tickets, badges, identification or membership cards, debit cards etc.; negotiable instruments and non-negotiable instruments, e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

For example, in one embodiment, the display element is a security element connected to a substrate. According to this embodiment the security element comprises a coating having a first state and a second state, and being adapted to switch from a first state to a second state in response to at least actinic radiation, to revert back to the first state in response to thermal energy, and to linearly polarize transmitted radiation in at least one of the first state and the second state. Examples of coatings adapted to switch from a first state to a second state in response to at least actinic radiation, to revert back to the first state in response to thermal energy, and to linearly polarize at least transmitted radiation in at least one of the first state and the second state and methods of making the same are set forth above in detail.

According to this embodiment, the security element can be a security mark and/or an authentication mark. Further, the security element can be connected to a substrate chosen from a transparent substrate and a reflective substrate. Alternatively, according to certain embodiments wherein a reflective substrate is required, if the substrate is not reflective or sufficiently reflective for the intended application, a reflective material can be first applied to the substrate before the security mark is applied thereto. For example, a reflective aluminum coating can be applied to the substrate prior to forming the security element thereon. Still further, the security element can be connected to a substrate chosen from untinted substrates, tinted substrates, photochromic substrates, tinted-photochromic substrates, linearly polarizing substrates, circularly polarizing substrates, and elliptically polarizing substrates.

Additionally, the coatings according to the aforementioned embodiment can comprise at least one photochromic-dichroic compound having an average absorption ratio of at least 1.5 in an activated state as determined according to the CELL METHOD. According to other embodiments disclosed herein, the photochromic-dichroic compound can have an average absorption ratio greater than 2.3 in an activated state as determined according to the CELL METHOD. According to still other embodiments, the photochromic-dichroic compound can have an average absorption ratio ranging from 1.5 to 50 in an activated state as determined according to the CELL METHOD. According to other embodiments, the photochromic-dichroic compound can have an average absorption ratio ranging from 4 to 20, can further having an average absorption ratio ranging from 3 to 30, and can still further having an average absorption ratio ranging from 2.5 to 50 in an activated state as determined according to the CELL METHOD. However, generally speaking, the average absorption ratio of the photochromic-dichroic compound can be any average absorption ratio that is sufficient to impart the desired properties to the device or element. Examples of photochromic-dichroic compounds that are suitable for use in conjunction with this embodiment are set forth above in detail.

Furthermore, the security elements according to the aforementioned embodiment can further comprise one or more other coatings or sheets to form a multi-layer reflective security element with viewing angle dependent characteristics as described in U.S. Pat. No. 6,641,874, which is hereby specifically incorporated by reference herein. For example, one embodiment provides a security element connected to a substrate comprising a coating having a first state and a second state, and being adapted to switch from a first state to a second state in response to at least actinic radiation, to revert back to the first state in response to thermal energy, and to linearly polarize at least transmitted radiation in at least one of the first state and the second state on at least a portion of the substrate; and at least one additional at least partial coating or sheet chosen from a birefringent layer, polarizing coatings or sheets, photochromic coatings or sheets, reflective coatings or sheets, tinted coatings or sheets, circularly polarizing coatings or sheets, retardation coatings or sheets (i.e., coatings or sheets that delay or retard the propagation radiation therethrough), and wide-angle view coatings or sheets (i.e., coatings or sheets than enhancing viewing angle). Further, according to this embodiment, the at least one additional coating or sheet can be positioned over the coating having the first state and the second state, under this coating, or multiple coating and/or sheets can be positioned over and/or under this coating.

Other embodiments provide a liquid crystal cell, which may be a display element or device, comprising a first substrate having a first surface and a second substrate having a second surface, wherein the second surface of the second substrate is opposite and spaced apart from the first surface of the first substrate so as to define an open region. Further, according to this embodiment, a liquid crystal material adapted to be at least partially ordered and a photochromic-dichroic compound adapted to be at least partially aligned and having an average absorption ratio of at least 1.5 in the activated state as determined according to the CELL METHOD positioned within the open region defined by the first surface and the second surface to form the liquid crystal cell.

Further according to this embodiment, the first substrate and the second substrate can be independently chosen from untinted substrates, tinted substrates, photochromic substrates, tinted-photochromic substrates, and linearly polarizing substrates.

The liquid crystal cells according to various embodiments disclosed herein can further comprise a first orientation facility positioned adjacent the first surface and a second orientation facility positioned adjacent the second surface. As previously discussed, it is possible to align a liquid crystal material with an oriented surface. Thus, according to this embodiment, the liquid crystal material of the liquid crystal cell can be at least partially aligned with the first and second orientation facilities.

Still further, a first electrode can be positioned adjacent the first surface, a second electrode can be positioned adjacent the second surface, and the liquid crystal cell can form an electrical circuit. Further, if an orientation facility is present (as discussed above), the electrode can be interposed between the orientation facility and the surface of the substrate.

Additionally, the liquid crystal cells according to various embodiments disclosed herein can further comprise a coating or sheet chosen from linearly polarizing coatings or sheets, photochromic coatings or sheets, reflective coatings or sheets, tinted coatings or sheets, circularly polarizing coatings or sheets, elliptically polarizing coating or sheets, retardation coatings or sheets, and wide-angle view coatings or sheets connected to at least a portion of a surface of at least one of the first substrate and the second substrate.

Other embodiments disclosed herein provide an optical element comprising a substrate and a coating having a first state and a second state on at least a portion of the substrate, the coating comprising a chiral nematic or cholesteric liquid crystal material having molecules that are helically arranged through the thickness of the coating; and at least one photochromic-dichroic compound that is at least partially aligned with the liquid crystal material such that the long axis of the molecules of the photochromic-dichroic compound are generally parallel to the molecules of the liquid crystal material. According to this embodiment, the coating can be adapted to be circularly polarizing or elliptically polarizing in at least one state.

In another non-limiting embodiment, the optical element of the present invention comprises a substrate such as packaging material for light-sensitive products to which a circular polarizer comprising an assembly of a linearly polarizing coating or an at least partially ordered polymeric sheet comprising an at least partially aligned reversible photochromic-dichroic material having an average absorption ratio of at least 1.5 in an activated state and a quarter wave retarder is connected. In a further non-limiting embodiment, the average absorption ratio is at least 2.3.

Various embodiments disclosed herein will now be illustrated in the following examples.

EXAMPLES

Example 1

Step 1—Photochromic Dye Mixture

A mixture of the solid photochromic dyes (1.6 grams) listed below was prepared by adding the dyes to a glass bottle and mixing with a spatula.

| Photochromic Dye | Weight Percent of Total Dye Mixture |
|---|---|
| Photochromic A [1] | 28.0 |
| Photochromic B [2] | 17.8 |
| Photochromic C [3] | 22.2 |
| Photochromic D [4] | 32.0 |

[1] Photochromic A is an indenonaphthopyran reported to produce a light purple activated color.
[2] Photochromic B is an indenonaphthopyran reported to produce a peach activated color.
[3] Photochromic C is an indenonaphthopyran reported to produce a blue green activated color.
[4] Photochromic D is an indenonaphthopyran reported to produce a green blue activated color.

Step 2—Resin Stabilizer Mixture

A mixture of the solid stabilizers was prepared to deliver the weight percent based on the weight of the total resin solids as listed in the Table below.

| Stabililzer | Weight Percent of Resin Solids |
|---|---|
| TINUVIN ® 144 [5] | 0.5 |
| IRGAPHOS ® 12 [6] | 1.0 |
| IRGANOX ® 1010 [7] | 1.0 |

[5] TINUVIN ® 144 is reported to be a light stabilizer of the hindered amine class (HALS) having CAS No. 63843-89-0 available from CIBA Specialty Chemicals.
[6] IRGAFOS ® 12 is reported to be a polymer processing stabilizer having CAS No. 80410-33-9 available from CIBA Specialty Chemicals.
[7] IRGANOX ® 1010 is reported to be a polymer processing and thermal stabilizer having CAS No. 6683-19-8.

Step 3—Polymer Processing

A Plasti-Corder mixer (made by C. W. Brabender Instruments, Inc.) was heated to 190° C. PEBAX® 5533 resin (about 40 grams), reported to be a polyether block amide available from Arkema, was added to the mixing head and mixed at 65 to 80 revolutions per minute (rpm) until melted. The resin stabilizer mixture from Step 2 was added and mixed at the same speed for about 1 minute. The photochromic dye mixture from Step 1 was added and mixed at the same speed for about 2 minutes. The resulting mixed material was removed from the Plasti-Corder mixer by reversing the direction of the mixing heads.

The recovered photochromic resin was placed between two Teflon® coated steel plates positioned in a PHI temperature controlled press. The press was heated to 190° C. After the photochromic resin began to melt on the bottom plate, the top plate was applied with increasing pressure for 1 minute and then the pressure was increased to 2-3 tons for about 2 minutes. After the pressure was released, the film coated plates were removed, allowed to cool at 20-25° C. for 4-5 minutes and immersed in water at from 15-25° C. water for 1-2 minutes. The Pebax film separated easily from the Teflon coated steel plates.

Step 4—Sample Preparation

Part A

A portion of the film from Step 3 was cut into a 5 by 5 centimeter (cm) piece that was placed between 2 MYLAR® polyester films with 100 micron aluminum spacers. The assembly was placed between two Teflon® coated steel plates positioned in a PHI temperature controlled press. The press was heated to 190° C. After the steel plates were in contact with the assembly for 1 minute, the pressure was increased to 2-3 tons for 7 to 10 minutes. After the pressure was released, the steel plates and the assembly were immersed in ice water to cool the sample from 190° C. to 0° C. in less than 20 seconds. The photochromic resin films were pulled apart from the MYLAR® polyester films.

Part B

A portion of the film from Part A was cut into a 5 by 5 cm piece and placed in the sample holders of an INSTRON® SF7 model 5543 instrument. The gap between the holders was 1 inch. The sample was stretched to 4x (101.5 mm) at a rate of 10 mm/minute under conditions of 20-22° C. and 40-65% relative humidity. After stretching, the 1 inch film was shown to be stretched roughly to 3.5 inches. Two films (Film 1 and Film 2) were produced following this procedure.

Part C

Film 1 was placed between 2 fused silica plates having a thickness of 3.3 mm and diameter of 50.86 mm available from McMaster Car and the plates were taped together. Film 1 is a clear to linear polarizer. For a clear to circular polarizer, 1 fused silica plate was placed in a PS-100 polarimeter. A ¼-wave plate obtained from Alight, having 140+/−10 nm retardation was added to the fused silica plate and oriented between crossed polarizers to get a null position indicating that the optical axes are along the same directions as the 2 linear polarizer transmission axes. Film 2 was added on top of the ¼-wave plate and was oriented independently until a maximum light intensity was observed. In this position, the orientation of Film 2 was such that the films transmission axis was 45 degrees between the fast and slow optical axes of the ¼-wave plate. A second fused silica disk was place on top of these films and the whole stack was taped together. Alignment of Film 2 to 45 degrees between the fast and slow axes of the ¼-wave plate was estimated to be 45+/−3 degrees.

Visual inspection of the UV activated samples with a linear polarizer and a circular polarizer showed that the Film 1 was a clear to linear polarizer and the stack of Film 2 with the ¼-wave plate demonstrated clear to circular polarization.

Step 5—Sample Testing

An optical bench was used to measure the optical properties of the films and derive the absorption ratios for each of the films when tested for clear to polarized and clear to circular polarized properties. Prior to testing, each of the samples was exposed to activating radiation (UVA) for 10 minutes at a distance of 15 centimeters (cm) from a bank of four UV Tubes BLE-7900B supplied by Spectronics Corp and then placed for one hour at 40° C. Subsequently, the samples were exposed for one hour at a distance of 15 cm from a bank of four UVless tubes F4OGO supplied by General Electric and finally held in the dark for at one hour. Afterwards, the stretched film assemblies were placed in a temperature controlled air cell at (23° C.±0.1° C.) on the optical bench. The activating light source (a Newport/Oriel Model 67005 300-Watt Xenon arc lamp housing, 69911 power supply and 68945 digital exposure controller fitted with a Uniblitz VS25 (with VMM-D4 shutter driver) high-speed computer controlled shutter that momentarily closed during data collection so that stray light would not interfere with the data collection process, a Schott 3 mm KG-2 band-pass filter, which removed short wavelength radiation, neutral density filter(s) for intensity attenuation and a condensing lens for beam collimation) was directed at a 30° to 35° angle of incidence to the surface of the stretched film side and not the ¼ wave plate side of the cell assembly.

A broadband light source for monitoring response measurements was positioned in a perpendicular manner to a surface of the cell assembly. Increased signal of shorter visible wavelengths was obtained by collecting and combining separately filtered light from a 100-Watt tungsten halogen lamp (controlled by a Lambda UP60-14 constant voltage powder supply) with a split-end, bifurcated fiber optical cable. Light from one side of the tungsten halogen lamp was filtered with a Schott KG1 filter to absorb heat and a Hoya B-440 filter to allow passage of the shorter wavelengths. The other side of the light was either filtered with a Schott KG1 filter or unfiltered. The light was collected by focusing light from each side of the lamp onto a separate end of the split-end, bifurcated fiber optic cable, and subsequently combined into one light source emerging from the single end of the cable. A 4" light pipe was attached to the single end of the cable to insure proper mixing.

Polarization of the light source was achieved by passing the light from the single end of the cable through a Moxtek, Proflux Polarizer held in a computer driven, motorized rotation stage (Model M-061-PD from Polytech, PI). The monitoring beam was set so that the one polarization plane (0°) was perpendicular to the plane of the optical bench table and the second polarization plane (90°) was parallel to the plane of the optical bench table.

Alignment of the polarization samples was accomplished by aligning the samples to find the null intensity between crossed polarizers. Prior to UV activation Films 1 and 2 were aligned as follows. Electrical dark, reference and dark spectra were collected at both 0 and 90 degree polarization directions. Film 1 was placed in the beam path and the laser (Coherent Ultra-low noise diode laser module centered at 635 nm) was directed through the crossed polarizers and sample by translating beam steering mirrors and a second MG polarizer (crossed with the Moxtek polarizer) into the beam path. The sample was rotated in 3 degree steps through 120 degrees to find a minimum in the counts. Then the sample was rotated +/−5 degrees around this minimum at 0.1 degree steps to locate the alignment direction of the sample to +/−0.1 degrees. The sample was now aligned to be either vertical or horizontal. The laser was switched closed, the laser directing mirrors and MG polarizer were removed from the optical path.

To conduct the clear to linear measurements, the cell assembly was exposed to 6.7 W/m² of UVA from the activating light source for 15 minutes to activate the photochromic-dichroic dyes. An International Light Research Radiometer (Model IL-1700) with a detector system (Model SED033 detector, B Filter, and diffuser) was used to verify exposure prior to the tests. Light from the monitoring source that was polarized to the 0° polarization plane was then passed through the coated sample and focused on a 1" integrating sphere, which was connected to an Ocean Optics 2000 spectrophotometer using a single function fiber optic cable. The spectral information, after passing through the sample, was collected using Ocean Optics OOIBase32 and OOIColor software, and PPG propriety software. While the photochromic-dichroic dyes were activated, the position of the Moxtek polarizer was rotated back and forth to polarize the light from the monitoring light source to the 90° polarization plane and back. Data was collected for approximately 15 minutes at 5-second intervals during activation and every 3 seconds during fade. For each test, rotation of the polarizers was adjusted to collect data in the following sequence of polarization planes: 0°, 90°, 90°, 0°, etc.

Absorption spectra were obtained and analyzed for each cell assembly using the Igor Pro software (available from WaveMetrics). The change in the absorbance in each polarization direction for each cell assembly was calculated by subtracting out the 0 time (i.e., unactivated) absorption measurement for the cell assembly at each wavelength tested. Photopic response measurements were collected since multiple photochromic compounds were used in the stretched films. Average absorbance values were obtained in the photopic region of the activation profile where the photochromic response was saturated or nearly saturated (i.e., the regions where the measured absorbance did not increase or did not increase significantly over time) for each cell assembly by averaging absorbance at each time interval in this region. The average absorbance values in a predetermined range of wavelengths corresponding $\lambda_{max-vis}$+/−5 nm were extracted for the 0° and 90° polarizations, and the absorption ratio for each wavelength in this range was calculated by dividing the larger average absorbance by the small average absorbance. For each wavelength extracted, 5 to 100 data points were averaged. The average absorption ratio for the photochromic-dichroic dyes was then calculated by averaging these individual absorption ratios. The average absorption ratio for the sample was then calculated by averaging these individual absorption ratios.

The results are reported below wherein the First Fade Half Life ("T½") value is the time interval in seconds for the ΔOD of the activated form of the photochromic-dichroic dyes in the sample to reach one half the maximum ΔOD at 73.4° F. (23° C.), after removal of the activating light source. The Second Fade Half Life ("2ndT½") value is the time interval in seconds for the ΔOD of the activated form of the photochromic-dichroic dyes in the sample to reach one quarter the maximum ΔOD at 73.4° F. (23° C.), after removal of the activating light source.

For each sample, the above-described procedure was run at least twice. The results reported below are for the stretched film alone as Example 1A and the stretched film with the ¼ wave plate as Example 1B. The tabled value for the Average Linear Absorption Ratio (Av. Lin. Abs. Ratio) represents an average of the results obtained from the runs. The results of the clear to linear polarized tests are presented in Table I below.

TABLE 1

Clear to Linear Polarization

| Example # | ΔOD 0° | ΔOD 90° | Av. Lin. Abs. Ratio | Av. OD | T½ | 2ndT½ |
|---|---|---|---|---|---|---|
| 1A | 0.34 | 1.26 | 3.70 | 0.57 | 50 | 138 |
| 1B | 0.40 | 1.39 | 3.52 | 0.64 | 56 | 168 |

The clear to circular polarization studies were conducted in the same manner as the clear to linear studies except for the modifications described below. The Moxtek polarizer was moved on the PI rotation stage to the side opposite of the film assembly. In order to do circular polarization measurements, the circular polarizers need to face each other such that the quarter wave plates are facing each other. To align the system, a known MG polarizer was placed in position prior to the cell assembly, oriented at 0 degrees for maximum transmission of the laser light (Coherent Ultra-low noise laser diode module −635 nm). The Moxtek polarizer was then rotated on the stage to achieve a null position. A quarter wave plate (from Melles Griot) was added to the optical path just before the Moxtek polarizer. The Quarter wave plate (mounted on a goniometer from Opto-Sigma which had a rotation center point 76 mm away from the top plate: this assembly was mounted on a 1.5 inch damped rod from Melles Griot) was rotated to achieve a null signal of the laser. This ensured that either the fast or slow axes of the quarter wave plate was aligned with the Moxtek polarizers transmission direction.

Next, the Moxtek polarizer was rotated 45 degrees and the MG polarizer was removed. The Moxtek polarizer now bisected the fast and slow axes of the MG quarter wave plate and produced either left hand or right hand circularly polarized light. Electrical dark, reference and dark reference spectra were collected for both left hand and right hand circularly polarized light by rotating the Moxtek Polarizer +/−90 degrees (alternatively bisecting the fast and slow axes of the MG quarter wave plate from fast to slow and then slow to fast).

With the reference spectra collected, the sample was inserted into the temperature controlled air cell. The Moxtek polarizer was rotated 45 degrees to be horizontal and the MG polarizer (at 0 degrees) was placed in the beam path to produce a crossed polarizer configuration. The cell assembly was placed in the beam path and the laser was directed through the crossed polarizers and sample. The sample was rotated in 3 degree steps through 120 degrees to find a minimum in the counts. Then the sample was rotated +/−5 degrees around this minimum at 0.1 degree steps to locate the alignment direction of the sample to +/−0.1 degrees. The sample was now aligned to be either vertical or horizontal. The laser was switched closed, the laser directing mirrors and MG polarizer were removed from the optical path, and the Moxtek polarizer was rotated 45 degrees to bisect the MG quarter wave plate again.

The data acquisition was done as before (120 second delay, 15 minutes activation at 5 second interval data collection, 30 minutes fade or to $2^{nd}$ half-life at 3 second intervals. The Moxtek polarizer was rotated +/−90 degrees throughout the data collection. Since the transmission axis of the Moxtek polarizer bisected the quarter wave plate (MG), then the rotation of the Moxtek polarizer went from bisecting the fast-slow axes to bisecting the slow-fast axes, which created right hand circular polarized light in one orientation and left-hand circular polarized light in the other orientation.

Measuring the stretched film with the quarter wave plate was essentially the same process except that the laser light intensity was reduced by using a 1.0 and 0.5 ND filter. The results of the clear to circular polarization studies for the stretched film alone are included as Example 1C and the stretched film with the ¼ wave plate are included as Example 1D and are listed below in Table 2.

TABLE 2

Clear to Circular Polarization

| Example # | ΔOD 0° | ΔOD 90° | Av. Cir. Abs. Ratio | Av. OD | T½ | 2ndT½ |
|---|---|---|---|---|---|---|
| 1C | 0.58 | 0.58 | 1.00 | 0.58 | 66 | 214 |
| 1D | 0.44 | 1.05 | 2.38 | 0.63 | 66 | 214 |

In Table 2, the clear to circular polarized sample 1D showed an average circular absorbance (Av. Cir. Abs.) ratio of 2.38 while the linear clear to polarized sample 1C showed an average circular absorbance ratio of 1.0. Linear polarizers do not "cross" with circular polarizers proving that 1D was exhibiting clear to circular polarization.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention, as defined by the appended claims.

We claim:

1. An optical element comprising:
   (a) a photochromic linear polarizing element comprising:
      (i) a substrate; and
      (ii) at least one coating connected to the substrate, the coating having a first absorption state and a second absorption state and being operable for switching from the first absorption state to the second absorption state in response to actinic radiation, to revert back to the first absorption state in response to actinic radiation and/or thermal energy, and to linearly polarize transmitted radiation in the first absorption state and/or the second absorption state; wherein the coating (ii) comprises an at least partially aligned, reversible photochromic-dichroic material having an average absorption ratio of at least 1.5 in an activated state; and
   (b) at least one birefringent layer comprising a polymeric coating or polymeric sheet connected to the photochromic linear polarizing element (a), the birefringent layer being operable to circularly or elliptically polarize transmitted radiation.

2. The optical element of claim 1 wherein said photochromic-dichroic material comprises:
   (a) at least one photochromic group PC chosen from a pyran, an oxazine, and a fulgide; and
   (b) at least one lengthening agent L attached to the at least one photochromic group and represented by:

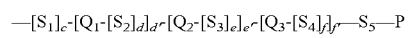

wherein:
   (i) each $Q_1$, $Q_2$, and $Q_3$ is independently chosen for each occurrence from: a divalent group chosen from: an unsubstituted or a substituted aromatic group, an unsubstituted or a substituted alicyclic group, an unsubstituted or a substituted heterocyclic group, and mixtures thereof, wherein substituents are chosen from: a group represented by P, liquid crystal mesogens, halogen, poly ($C_1$-$C_{18}$ alkoxy), $C_1$-$C_{18}$ alkoxycarbonyl, $C_1$-$C_{18}$ alkylcarbonyl, $C_1$-$C_{18}$alkoxycarbonyloxy, aryloxycarbonyloxy, perfluoro($C_1$-$C_{18}$)alkoxy, perfluoro($C_1$-$C_{18}$) alkoxycarbonyl, perfluoro($C_1$-$C_{18}$)alkylcarbonyl, perfluoro($C_1$-$C_{18}$)alkylamino, di-(perfluoro($C_1$-$C_{18}$) alkyl)amino, perfluoro($C_1$-$C_{18}$)alkylthio, $C_1$-$C_{18}$ alkylthio, $C_1$-$C_{18}$acetyl, $C_3$-$C_{10}$cycloalkyl, $C_3$-$C_{10}$ cycloalkoxy, a straight-chain or branched $C_1$-$C_{18}$alkyl group that is mono-substituted with cyano, halo, or $C_1$-$C_{18}$ alkoxy, or poly-substituted with halo, and a group comprising one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and t is the valence of M;

(ii) c, d, e, and f are each independently chosen from an integer ranging from 1 to 20, inclusive; and each $S_1$, $S_2$, $S_3$, $S_4$, and $S_5$ is independently chosen for each occurrence from a spacer unit chosen from:

(A) —($CH_2$)$_g$—, —($CF_2$)$_h$—, —Si($CH_2$)$_g$—, —(Si[($CH_3$)$_2$]O)$_h$—, wherein g is independently chosen for each occurrence from 1 to 20; h is a whole number from 1 to 16 inclusive;

(B) —N(Z)-, —C(Z)=C(Z)-, —C(Z)=N—, —C(Z')-C (Z')- or a single bond, wherein Z is independently chosen for each occurrence from hydrogen, $C_1$-$C_{18}$ alkyl, $C_3$-$C_{10}$ cycloalkyl and aryl, and Z' is independently chosen for each occurrence from $C_1$-$C_{18}$ alkyl, $C_3$-$C_{10}$cycloalkyl and aryl; and (C) —O—, —C(O)—, —C≡C—, —N=N—, —S—, —S(O)—, —S(O)(O)—, —(O)S(O)O—, —O(O)S(O) O— or straight-chain or branched $C_1$-$C_{24}$ alkylene residue, said $C_1$-$C_{24}$ alkylene residue being unsubstituted, mono-substituted by cyano or halo, or poly-substituted by halo; provided that when two spacer units comprising heteroatoms are linked together the spacer units are linked so that heteroatoms are not directly linked to each other and when $S_1$ and $S_5$ are linked to PC and P, respectively, they are linked so that two heteroatoms are not directly linked to each other;

(iii) P is chosen from: hydroxy, amino, $C_2$-$C_{18}$ alkenyl, $C_2$-$C_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy) ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl ($C_1$-$C_{18}$)alkyl, $C_1$-$C_{18}$ alkyloxycarbonyloxy, halocarbonyl, hydrogen, aryl, hydroxy($C_1$-$C_{18}$)alkyl, $C_1$-$C_{18}$alkyl, $C_1$-$C_{18}$alkoxy, amino($C_1$-$C_{18}$)alkyl, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-$C_{18}$)alkoxy, nitro, poly($C_1$-$C_{18}$)alkyl ether, ($C_1$-$C_{18}$)alkyl($C_1$-$C_{18}$) alkoxy($C_1$-$C_{18}$)alkyl, polyethyleneoxy, polypropyleneoxy, ethylenyl, acryloyl, acryloyloxy($C_1$-$C_{18}$)alkyl, methacryloyl, methacryloyloxy($C_1$-$C_{18}$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, fumaric acid derivatives, unsubstituted cinnamic acid derivatives, cinnamic acid derivatives that are substituted with at least one of methyl, methoxy, cyano and halogen, or substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$)alkoxy, fluoro($C_1$-$C_{18}$)alkyl, cyano, cyano ($C_1$-$C_{18}$)alkyl, cyano($C_1$-$C_{18}$)alkoxy or mixtures thereof, or P is a structure having from 2 to 4 reactive groups or P is an unsubstituted or substituted ring opening metathesis polymerization precursor;

(iv) d', e' and f' are each independently chosen from 0, 1, 2, 3, and 4, provided that a sum of d'+e'+f' is at least 1.

3. The optical element of claim 1, further comprising at least one orientation facility having at least a first general direction connected to at least a portion of the substrate.

4. The optical element of claim 1 wherein the coating (ii) comprises two or more at least partially aligned reversible photochromic-dichroic materials, wherein the photochromic-dichroic materials have complementary absorption spectra and/or complementary linear polarization states.

5. The optical element of claim 1 wherein said coating (ii) comprises at least one self-assembling material.

6. The optical element of claim 5 wherein said self-assembling material is chosen from liquid crystal materials, block copolymers and mixtures thereof.

7. The optical element of claim 1 wherein the coating (ii) further comprises a phase-separated polymer comprising an at least partially ordered matrix phase and an at least partially ordered guest phase, wherein the guest phase comprises a reversible photochromic-dichroic compound that is at least partially aligned with the guest phase.

8. The optical element of claim 1 wherein the coating (ii) further comprises an interpenetrating polymer network comprising an at least partially ordered anisotropic material and a polymeric material, wherein the anisotropic material comprises a reversible photochromic-dichroic compound that is at least partially aligned with the anisotropic material.

9. The optical element of claim 1 wherein said coating (ii) comprises a coating having a first ordered region having a first general direction, and at least one second ordered region adjacent the first ordered region having a second general direction that is the same or different from the first general direction so as to form a desired pattern in the coating.

10. The optical element of claim 1 wherein said coating (ii) is adapted to transition from a first state to a second state in response to actinic radiation, and to linearly polarize transmitted radiation in at least the second state.

11. The optical element of claim 1 wherein the coating (ii) further comprises at least one additive chosen from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, gelators and adhesion promoters.

12. The optical element of claim 1 further comprising at least one additional at least partial coating chosen from photochromic coatings, anti-reflective coatings, linearly polarizing coatings, transitional coatings, primer coatings, adhesive coatings, mirrored coatings and protective coatings.

13. The optical element of claim 1 wherein said birefringent layer (b) comprises a layer having a first ordered region having a first general direction, and at least one second ordered region adjacent the first ordered region having a second general direction that is the same or different from the first general direction so as to form a desired pattern in the layer.

14. The optical element of claim 1 wherein said birefringent layer (b) comprises a polymeric coating chosen from self-assembling materials and film-forming materials.

15. The optical element of claim 1 wherein said birefringent layer (b) comprises a polymeric sheet comprising self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof.

16. The optical element of claim 1 wherein the birefringent layer (b) comprises a quarter-wave plate.

17. The optical element of claim 1, wherein the optical element comprises ophthalmic elements, display elements, windows, mirrors, packaging materials, and/or active and passive liquid crystal cell elements and devices.

18. The optical element of claim 17, wherein the ophthalmic element comprises corrective lenses, non-corrective lenses, contact lenses, intra-ocular lenses, magnifying lenses, protective lenses, or visors.

19. The optical element of claim 17, wherein the display element comprises screens, monitors, and security elements.

20. The optical element of claim 1 wherein said substrate is formed from organic materials, inorganic materials, or combinations thereof.

21. The optical element of claim 20 wherein said substrate is at least translucent.

22. The optical element of claim 21 wherein said optical element is connected to a display element.

* * * * *